US008688346B2

(12) United States Patent
Boughtwood

(10) Patent No.: US 8,688,346 B2
(45) Date of Patent: *Apr. 1, 2014

(54) ELECTRIC MOTORS

(71) Applicant: Protean Electric Limited, Surrey (GB)

(72) Inventor: Martin Boughtwood, Hampshire (GB)

(73) Assignee: Protean Electric Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/662,297

(22) Filed: Oct. 26, 2012

(65) Prior Publication Data
US 2013/0049498 A1    Feb. 28, 2013

Related U.S. Application Data

(62) Division of application No. 12/373,202, filed as application No. PCT/GB2007/002651 on Jul. 13, 2007.

(30) Foreign Application Priority Data

Jul. 13, 2006 (GB) .................................. 0613941.4

(51) Int. Cl.
*B60B 39/00*    (2006.01)

(52) U.S. Cl.
USPC .............. 701/71; 310/215; 310/218; 318/16; 379/48; 60/394; 264/289.6

(58) Field of Classification Search
USPC ......... 310/215, 218; 318/16; 379/48; 60/394; 264/289.6
See application file for complete search history.

(56) References Cited

U.S. PATENT DOCUMENTS 2,749,708 A * 6/1956 Douglas ........................ 60/394
3,376,575 A * 4/1968 Peters .............................. 318/16
(Continued)

FOREIGN PATENT DOCUMENTS

CH    1266371 A    3/1972
DE    10258931 A1    7/2004
(Continued)

OTHER PUBLICATIONS

Combined Search and Examination Report in related British Application No. GB0913690.4 dated Sep. 7, 2009, 4 pgs.
(Continued)

*Primary Examiner* — Muhammad Shafi
*Assistant Examiner* — Sanjeev Malhotra
(74) *Attorney, Agent, or Firm* — The Mason Group Patent Specialists LLC; Valerie M. Davis

(57) ABSTRACT

An electric motor includes one or more separate coil sets arranged to produce a magnetic field of the motor. The electric motor also includes a plurality of control devices coupled to respective sub-sets of coils for current control. A similar arrangement is proposed for a generator. A coil mounting system for an electric motor or generator includes one or more coil teeth for windably receiving a coil for the motor and a back portion for attachably receiving a plurality of the coil teeth. A traction control system and method for a vehicle having a plurality of wheels independently powered by a respective motor. A suspension control system and method for a vehicle having a plurality of wheels, each wheel being mounted on a suspension arm of the vehicle and being independently powered by a respective motor.

4 Claims, 17 Drawing Sheets

(56) References Cited

U.S. PATENT DOCUMENTS

| | | | |
|---|---|---|---|
| 3,598,918 A * | 8/1971 | Dee et al. ................ 379/48 |
| 4,434,389 A | 2/1984 | Langley et al. |
| 5,894,902 A | 4/1999 | Cho |
| 6,042,349 A | 3/2000 | Ito et al. |
| 7,126,309 B1 | 10/2006 | Takeuchi et al. |
| 7,273,578 B1 * | 9/2007 | Slutsker et al. ........ 264/289.6 |
| 2002/0158509 A1 | 10/2002 | Herrmann |
| 2004/0021437 A1 | 2/2004 | Maslov et al. |
| 2004/0108789 A1 | 6/2004 | Marshall |
| 2004/0124733 A1 * | 7/2004 | Yamamoto et al. ........ 310/218 |
| 2004/0145323 A1 | 7/2004 | Maslov et al. |
| 2004/0231904 A1 | 11/2004 | Beck et al. |
| 2004/0251651 A1 | 12/2004 | Yamamoto et al. |
| 2006/0113859 A1 | 6/2006 | Lu et al. |
| 2010/0133947 A1 * | 6/2010 | Chamberlin et al. ...... 310/215 |

FOREIGN PATENT DOCUMENTS

| | | |
|---|---|---|
| EP | 1745974 A1 | 1/2007 |
| EP | 2026448 A1 | 2/2009 |
| GB | 2217924 A | 11/1989 |
| GB | 2220681 A | 1/1990 |
| GB | 2224399 A | 5/1990 |
| GB | 2250142 A | 5/1992 |
| GB | 2312102 A | 10/1997 |
| GB | 2405748 A | 3/2005 |
| GB | 2423421 A | 8/2006 |
| JP | 59041137 A | 3/1984 |
| JP | 63202239 A1 | 8/1988 |
| JP | 04183258 A | 6/1992 |
| JP | 07077889 A1 | 1/1995 |
| JP | 08080015 A1 | 3/1996 |
| JP | 10304645 A | 11/1998 |
| JP | 2000197293 A1 | 7/2000 |
| JP | 2004274838 A | 9/2004 |
| JP | 2006197785 A | 7/2006 |
| JP | 2008155769 A | 7/2008 |
| SU | 474076 A1 | 6/1975 |
| WO | 9206530 A1 | 4/1992 |
| WO | 9414226 A1 | 6/1994 |
| WO | 9505699 A1 | 2/1995 |
| WO | 9957795 A | 11/1999 |
| WO | 2004073157 A3 | 8/2004 |
| WO | 2006124554 A3 | 11/2006 |
| WO | 2007018767 A3 | 2/2007 |

OTHER PUBLICATIONS

First Office Action in related Chinese Application No. 200780026507.2 dated Sep. 9, 2010, 11 pgs.
Combined Search and Examination Report in related British Application No. GB0913688.8 dated Sep. 10, 2009, 5 pgs.
Combined Search and Examination Report in related British Application No. GB0913687.0 dated Sep. 7, 2009, 9 pgs.
English Abstract, JP 2008155769, Jul. 10, 2008, 2 pages.
Abstract for Japanese Publication No. JP10304645 A, published Nov. 13, 1998, Toyota Motor Corp, 2 pgs.
Search Report in related British Application No. GB0713695.5 dated Feb. 22, 2011, 3 pgs.
Abstract for Japanese Publication No. JP2004274838 A, published Sep. 30, 2004, Matsushita Electric Ind Co Ltd., 2 pgs.
Intellectual Property Office, "Search Report Under Section 17," Application No. GB0713695.5, May 9, 2008, 1 page.
Intellectual Property Office, "Examination Report Under Section 18(3)," Application No. GB0713695.5, Jul. 1, 2010, 6 pages.
Intellectual Property Office, "Examination Report Under Section 18(3)," Application No. GB0713695.5, Mar. 2, 2011, 2 pages.
English Abstract, JP 2006197785 A, Jul. 27, 2006, 1 page.
English Abstract, JP 04183258 A, Jun. 30, 1992, 2 pages.
English Abstract, JP 59041137 A, Mar. 7, 1984, 2 pages.

* cited by examiner

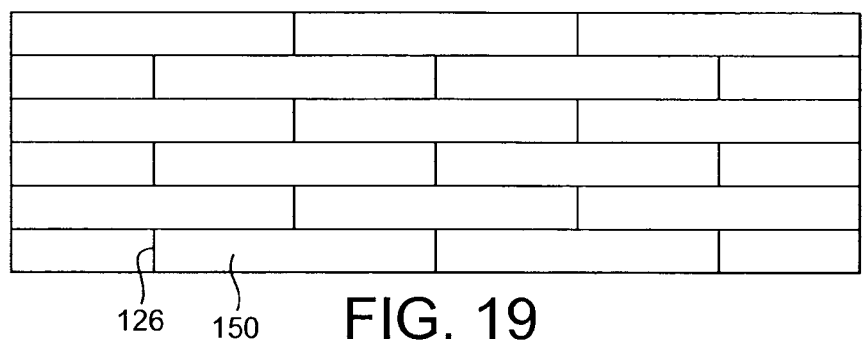
126  150    FIG. 19
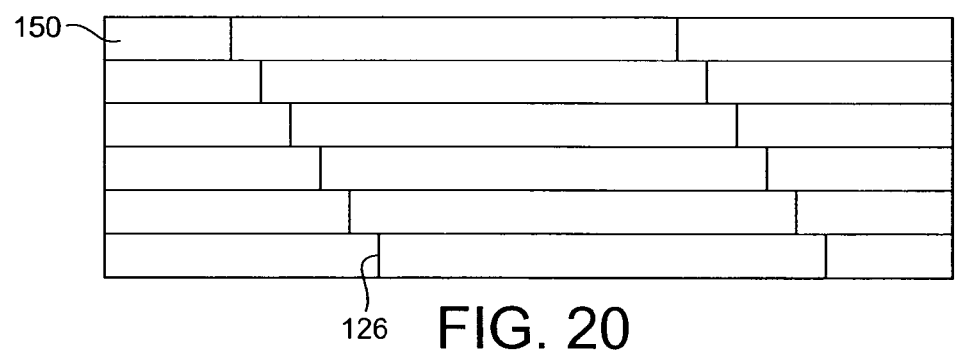
126    FIG. 20

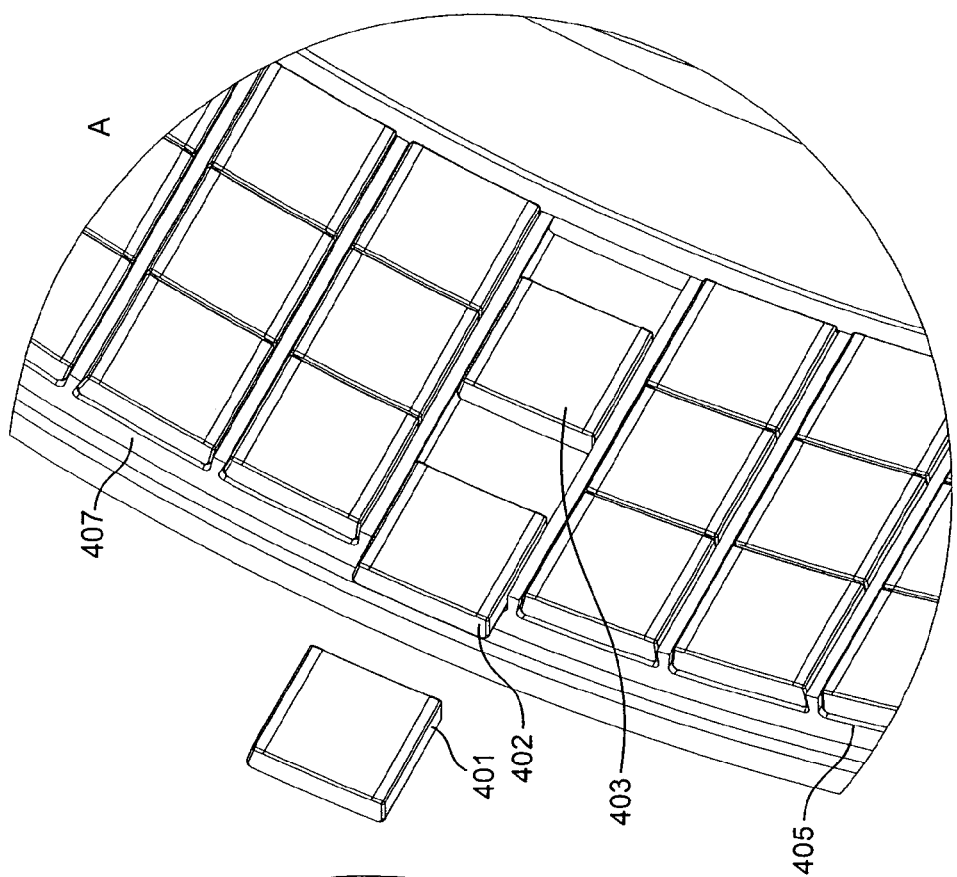
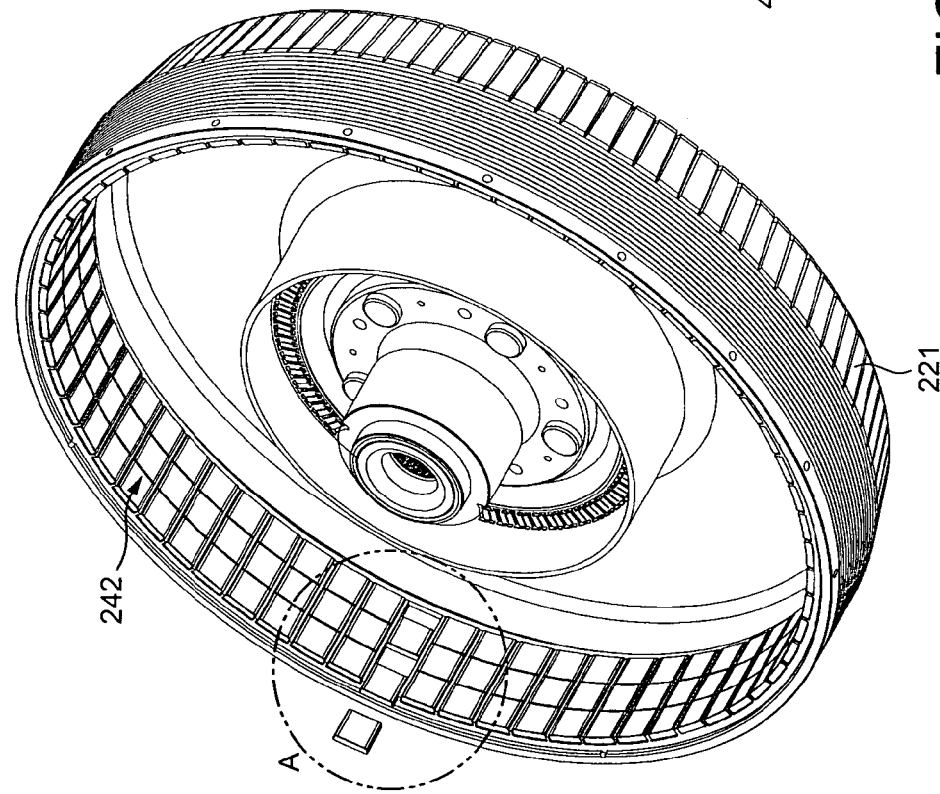
FIG. 24

US 8,688,346 B2

ELECTRIC MOTORS

RELATED APPLICATIONS

This application is a divisional application of U.S. patent application Ser. No. 12/373,202, which is a US 371 national stage entry of International Application No. PCT/GB2007/002651, filed Jul. 13, 2007, which claims priority to United Kingdom Patent Application No. GB 0613941.4, filed Jul. 13, 2006, the teachings each of which are incorporated herein by reference.

FIELD OF THE INVENTION

The invention relates to electric motors or generators and to a traction control system.

BACKGROUND OF THE INVENTION

Known electric motor systems typically include a motor and a control unit for controlling power to the motor. Known types of electric motor include the induction motor, brushless permanent magnet motor, switched reluctance motor and synchronous slip ring machine. Three phase electric motors are the most common kind of electric motor available.

FIG. 1 shows a schematic representation of a typical three phase motor. In this example, the motor includes three coil sets. Each coil set produces a magnetic field associated with one of the three phases of the motor. In a more general example, N coil sets can be used to produce an N-phase electric motor. Each coil set can include one or more sub-sets of coils which are positioned around a periphery of the motor. In the present example, each coil set includes four such sub-sets—the coil sub-sets of each coil set are labelled 14, 16 and 18, respectively in FIG. 1. As shown in FIG. 1, the coil sub-sets 14, 16, 18 are evenly distributed around the motor 10 to co-operate in producing a rotating magnetic field within which a central rotor 12, which typically incorporates one or more permanent magnets, can rotate as shown by the arrow labelled C. The coil sub-sets of each coil set are connected together in series as shown by the connections 24, 26 and 28 in FIG. 1. This allows the currents in the coils of each coil set to be balanced for producing a substantially common phase. The wires of each coil set are terminated as shown at 34, 36 and 38 in FIG. 1. Typically, one end of the wire for each coil set is connected to a common reference terminal, while the other wire is connected to a switching system for controlling the current within all of the coils of that coil set. Typically then, current control for each coil set involves controlling a common current passing through a large number of coils.

As shown in FIG. 2, each coil sub-set can include one or more coils. In particular, FIG. 2 shows the coils 24A, 24B in one of the coil sub-sets 14. In this example, there are two coils per coil sub-set. The two coils are wound in the opposite directions, and are interconnected so that the current flowing in each coil is substantially the same. As the poles of the rotor 12 sweep across the coils 24A, 24B, switching of the current in the coils 24A, 24B can produce the appropriate magnetic field for attracting and repelling the rotor for continued rotation thereof. The magnetic field produced by the two oppositely wound coils 24A, 24B is referred to as belonging to the same phase of this three phase motor. Every third coil sub-set arranged around the periphery of the motor 10 produces a magnetic field having a common phase. The coils and the interconnections may typically comprise a single piece of wire (e.g. copper wire) running around the periphery of the motor and wound into coils at the appropriate locations.

For a three phase electric motor, the switching system is almost invariably a three phase bridge circuit including a number of switches.

Typical power electronic switches including the Metal Oxide Silicon Field Effect Transistor (MOSFET) and the Insulated Gate Bipolar Transistor (IGBT) exhibit two principal losses: switching losses and conduction losses.

While switching losses decrease with switching speed, a faster switching speed also leads to increased electromagnetic interference (EMI) noise. This problematic trade off between switching speed and EMI noise is compounded at higher power ratings (e.g. for a larger motor), since larger switches are required. The inductance associated with a power switch and its connection system increases with the physical size of the switch. This inductance impacts the switching speed of the power device and the switching speed of a power device is typically therefore limited by its physical size. Accordingly, for high power ratings larger switches must be used, but larger switches involve slower switching speeds and therefore larger switching losses. Moreover, the cost of a power device increases roughly with the square of the size of the device. Conduction losses also increase with increased power.

Including switching losses and conduction losses, the total losses are approximately proportional to the square of the power. This imposes serious thermal management problems for the motor since, for example, a doubling of the power leads to a four fold increase in thermal losses. Extracting this heat without elevating the temperature of the device above its safe operating level becomes the limiting factor in what power the device can handle. Indeed, today larger power devices having intrinsic current handling capabilities of, for example, 500 A are restricted to 200 A due to thermal constraints.

Consider a conventional three phase motor with a given power rating. If a larger power rating is desired, this can be achieved by producing a motor with a larger diameter. For a larger motor diameter, the peripheral speed of the rotor increases for a given angular velocity. For a given supply voltage this requires that the motor coils to have a reduced number of turns. This is because the induced voltage is a function of the peripheral speed of the rotor and the number of turns in the coils. The induced voltage must always be at or below the supply voltage.

However, the reduced number of turns in the coils leads to a reduced inductance for the motor, since the inductance of the motor is proportional to the square of the number of turns.

Almost all electronic control units for electric motors today operate by some form of pulse width modulation (PWM) voltage control. PWM control works by using the motor inductance to average out an applied pulse voltage to drive the required current into the motor coils. Using PWM control an applied voltage is switched across the motor windings for a minimum period dictated by the power device switching characteristic. During this on period, the current rises in the motor winding at a rate dictated by its inductance and the applied voltage. The PWM control is then required to switch off before the current has changed too much so that precise control of the current is achieved.

As discussed above, the use of larger power devices leads to a slower switching speed, while a larger motor also has a lower inductance. For higher power motors, these two factors inhibit the effectiveness of PWM as a control system because the current in the motor coils rises more rapidly (due to the low inductance of the motor due to the fewer number of turns in the coils) but the PWM control is more coarse (due to the slow switching speed achievable using high power switching devices).

A known solution to this problem is to introduce additional inductance in the motor in the form of current limiting chokes in series with the motor windings. This added inductance increases the rise time of the current in the motor coils. However, the chokes are typically as large or larger than the motor itself and as they carry the full current they dissipate a large additional heat loss as well as being a substantial extra volume, weight and cost.

Other problems with known motors relate to their manufacture. As described above in relation to FIG. 1, motor construction typically involves using a single length of wire to produce the windings for each phase of the motor. The wire runs around a periphery of the motor and coils are wound at the appropriate locations for producing a phase of the magnetic field of the motor. Winding the coils of the motor, as well as terminating the connections between each coil sub-set interspersed around the motor periphery is a labour intensive task. The thick wire (e.g. copper wire) typically used in motor windings is difficult to manipulate and in many motor designs, access to the innards of the motor for installing the coils and their interconnections is limited. Known coil mounting systems are also bulky and have limited heat dispersing capabilities.

Vehicle traction control can be used for minimizing the risk of skids which can occur while the vehicle is moving. A vehicle relying on wheel traction to provide a resultant locomotive force suffers from the phenomenon of wheel skid. Steering skids can also occur. In a steering skid, the motion of the vehicle is out of alignment with that of the front wheels (commonly known as under-steer) or the rear wheels (over-steer).

In general, the onset of a skid is not a sudden event, but starts with a degree of wheel slip, which then builds up to a full wheel skid. The amount of force needed to produce a wheel slip or skid can be calculated by the weight on the wheel multiplied by a coefficient of friction between the tyre and the road surface. If this force is exceeded, then a wheel slip or skid will occur. At forces just below the force at which wheel slip or skid can occur, maximum drive performance is being obtained while the wheel is still in grip. Traction control systems generally aim to allow operation in this region, whereby maximum force can be applied to the wheels with allowing wheel slip or skid to occur.

In known systems, torque is applied to the wheels of a vehicle from a central internal combustion engine through a drive shaft and differential gears. Traction control is normally applied through modulating the brake discs pressure (for braking) or by modulating a slip clutch mechanism by each wheel (for acceleration). These traction control systems require expensive mechanical parts and do not always provide the best performance. For example, ABS brakes tend to shudder violently as they are operated on a crude on/off basis. Slip clutches have an effect on left/right torque balancing from the engine.

SUMMARY OF THE INVENTION

Aspects of the invention are defined in the accompanying claims. For ease of understanding, aspects of the invention are given subheadings below corresponding to accompanying parts of the description but, for the avoidance of doubt, these aspects may be used together in a single embodiment of the invention.

Coil Control

According to an aspect of the invention, there is provided an electric motor. The motor includes one or more separate coil sets arranged to produce a magnetic field of the motor. Each coil set includes a plurality of coil sub-sets. Each coil sub-set includes one or more coils. The magnetic field produced by the coils in each coil set have a substantially common phase. The motor also includes a plurality of control devices each coupled to a respective coil sub-set for controlling a current in the coils of that respective coil sub-set. Each control device is operable without requiring an input synchronisation signal.

Control of the currents in the coils of the motor is enhanced because the current in each coil sub-set can be controlled independently of the current in another coil sub-set. Because all of the coils of each coil set are not connected in series, the coil or coils of each coil sub-set can have a larger number of turns. The increased number of turns in each coil increases the overall inductance of the motor. This means that lower currents can be used in the coils of each coil sub-set, which leads to fewer heat dissipation problems, and which allows smaller switching devices to be used. The use of smaller switching devices in turn allows for faster switching speeds and lower switching losses.

The control devices can include one or more switches for applying a pulsed voltage to the one or more coils of a coil sub-set. PWM control of the currents in the motor coils can be enhanced due to the increased number of turns which can be included in the coils. Because smaller switching device can be used, significant savings in cost, weight and heat dissipation can be made.

Some of the control devices can include means for monitoring a back EMF within the coils of that coil sub-set. The control device can adjust a pulse of the pulsed voltage (e.g. a width of the pulse) in response to the monitored back EMF for high speed power control. The control devices can operate independently of one another because each control device comprises sufficient logic to determine the position of the rotor and so to apply the appropriate voltage to control the current in the respective coil subset. The control devices can receive a demand signal from an external device, such as a brake pedal sensor, and apply appropriate coil control based on the coil characteristics, the position of the rotor and the demand signal.

Since smaller components (e.g. switching devices) can be used, they can be housed within a casing of the motor, in contrast to known systems using large, bulky switching devices. For example, the control devices can be located adjacent their respective coil sub-sets within the motor thereby simplifying termination of the coil windings. The casing of the motor can include one or more apertures dimensioned such that the control devices can be accessed one at a time, depending on the orientation of the rotor/casing and the control devices.

A common control device can be provided to coordinate the operation of the plurality of control devices. For example, the common control device can be used to coordinate the switches within the plurality of control devices to ensure that the switching of the currents in each coil set is substantially in phase. In this way, the control devices can operate to emulate a motor in which the coils of each coil set are all connected in series. Alternatively, each control device can control its phase relationship by detecting a position of the rotor of the motor and in this way provide for complete parallel operation, without dependence on central controller. This would enhance immunity to any single failure within the motor.

The common control device can be operable to selectively disable one or more of the control devices to allow fractional power operation.

According to another aspect of the invention, there can be provided a method of operating an electric motor of the kind described above. The method includes using the plurality of control devices to supply power to the coils of the respective coil sub-sets for producing the magnetic field of the motor.

It will be appreciated that an electric generator is structurally similar to an electric motor, and that some of the considerations discussed above can also be employed in a novel generator.

According to a further aspect of the invention, there can be provided an electric generator. The generator includes one or more separate coil sets arranged to produce an induced current due to a magnetic field produced within the generator. Each coil set includes a plurality of coil sub-sets. Each coil sub-set includes one or more coils. The current produced in the coils of each coil set have a common phase.

The generator also includes a plurality of power outputs each coupled to a respective coil sub-set for outputting current produced in the coils of said respective coil sub-set.

Position Sensing

A further aspect of the invention is the use of an iron focussing ring to assist in the alignment of magnetic fields used to detect the position of a rotor with respect to a stator.

Braking Arrangement

According to a further aspect of the invention, there is provided an electric motor configurable to operate in a braking mode. The motor includes one or more coil sets arranged to produce a magnetic field. Each coil set including a plurality of sub-sets. Each coil sub-set including one or more coils. The motor also includes a plurality of control devices each coupled to a respective coil sub-set for controlling a current in the one or more coils of the respective coil sub-set. The control devices being operable by current drawn from the coils when in a braking mode.

Since the control devices can operate from current drawn from the coils, a fail-safe braking arrangement is provided as the control devices can continue to operate (and thereby control braking) even in the event of failure of the power supply. Preferably, each control device is arranged so that it is operable from current from one respective sub-set of coils when in a braking mode. This ensures that there is redundancy built into the braking arrangement, as, in the event of failure of a coil, other coils and control devices would still be operable to provide a braking force.

The motor preferably also includes a capacitance coupled between the coils and a connection for a power supply. The capacitance ensures that current can continue to be supplied to the control devices when a transition occurs between a power consuming mode and non-power consuming mode. The motor also includes a resistance selectively coupled to the control devices such that in an emergency braking mode power from the coils may be consumed by the resistance. An emergency braking mode is one in which a power supply is unable to receive power from the coils, for example, because the power supply such as a battery has failed, a battery is full or a connection has failed. The resistance is preferably arranged very close to the control devices and coils thereby reducing the risk of connection failure.

An aspect of the invention also provides a control arrangement for use with the motor described above, comprising a mechanical brake control device being connected to a plurality of brake controller circuits, each brake controller circuit being coupled to a respective electric motor. In the example of a vehicle, the mechanical brake control device is a brake pedal and separate brake controller circuits are connected to the brake pedal so as to provide redundancy such that in the failure of any one brake controller circuit, other circuits are operable to control the braking force provided by one of the motors connected to drive a respective wheel of the vehicle.

Coil Switching

The plurality of control devices can be configured to provide staggered switching of the currents in the coils of the motor within a polyphase cycle of the motor. This allows EMI noise to be mitigated by spreading the switching events across a given time period. This aspect operates by causing PWM switching events to occur at different times in different coils.

Embodiments of this invention can be employed to produce, for example, a linear or rotary motor. For example, the coil sets can be arranged to produce a rotating magnetic field, and the motor can include a magnet mounted to rotate within the rotating field.

Coil Mounting

According to another aspect of the invention, there can be provided a coil mounting system for an electric motor. The system includes one or more coil teeth for windably receiving a coil for the motor. The system also includes a back portion for attachably receiving a plurality of the coil teeth.

The coil teeth provide a means by which a coil winding can be prepared separately and away from the motor and other coils. In this way, each coil can be prepared relatively easily, with easy access to the coil tooth and without the other components of the motor getting in the way. The back portion provides a means by which the coils of mounting system, once wound, can be attached in a desired arrangement for producing the appropriate magnetic field.

The coil tooth can include an elongate arm for windably receiving the coil. Again, this simplifies the task of producing the coils.

The coil tooth can include a shaped attachment portion, and the back portion can include a correspondingly shaped receiving portion. This can provide a simple and robust attachment between the teeth and back portion. The attachment portion of the coil tooth can have two fingers in a V shaped configuration. The fingers can be angled to run substantially along magnetic field lines produced by a coil wound on the tooth, thereby to reduce interference of the fingers with the field.

A plurality of interconnected back portions can be provided. Again this provides further flexibility in designing and constructing the motor. For example, multiple back portions, each carrying a number of teeth, can be assembled separately and then connected together to form a larger back portion and tooth arrangement for the motor. The back portions can be stacked one above the other, and the back portions in each layer can be interconnected in such a way that the interconnections are staggered such that they do not coincide vertically. This increases construction strength. The interconnections between back portions can be provided via the teeth.

The back portion can be shaped and dimensioned to produce a desired arrangement for the coil teeth attached thereto. For example, the back portion can be arcuate. This would allow a circular motor to be constructed incorporating the mounting system. The back portion and/or the coil tooth have a laminated construction.

According to a further aspect of the invention, there can be provided an electric motor or an electric generator including the coil mounting system described above.

According to another aspect of the invention, there can be provided a vehicle including a motor of the kind described above.

According to a further aspect of the invention, there can be provided a method of manufacturing the electric motor or generator described above. The method includes winding a coil for the electric motor or generator onto the coil tooth. The method also includes attaching the coil tooth with coil to the back portion.

The method can also include connecting the coil to a control device configured to provide individual current control for the coil. This method lends itself to a motor, which includes control devices of this kind, since it is not necessary to use a single conductor to produce the windings for each tooth. Instead, the coil of each tooth can be wound separately and then connected directly to a control device.

Traction Control

According to another aspect of the invention, there can be provided a traction control system for a vehicle including a plurality of wheels, each wheel being independently powered by a respective motor. The control system includes sensors for detecting an acceleration in the rotation of each of the wheels. The control system also includes a control unit for adjusting a torque applied to each wheel by each respective motor in response to detecting a predetermined acceleration in the rotation of one or more of the wheels. The predetermined acceleration is indicative of a skid.

A respective control unit can be provided for each wheel. Each control unit may be operable to perform traction control independently of other control units in the system according to predetermined rules. The control units can be networked for exchanging wheel acceleration data. The control units can be operable to provide continuous torque adjustment for the wheels.

According to a further aspect of the invention, there can be provided a vehicle including a plurality of wheels, each wheel being independently powered by a respective motor. The vehicle includes the traction control system described above.

Suspension Control

According to another aspect of the invention, there can be provided a suspension control system for a vehicle having a plurality of wheels, each wheel being mounted on a suspension arm of the vehicle and being independently powered by a respective motor. The system includes a control unit for selectively adjusting a torque applied to each wheel to apply a force to each respective suspension arm.

The control unit can be operable to selectively adjust a torque applied to each wheel to apply a force to each respective suspension arm to alter a height of the vehicle.

According to a further aspect of the invention, there can be provided vehicle having a plurality of wheels, each wheel being mounted on a suspension arm and being independently powered by a respective motor. The vehicle includes the suspension control system described above.

The motors of the vehicles described above can be electric motors, such as the electric motors described above.

According to another aspect of the invention, there can be provided a traction control method for a vehicle comprising a plurality of wheels, each wheel being powered by a separate motor. The method includes detecting an acceleration in the rotation of one or more of the wheels. The method also includes adjusting a torque applied to each wheel by each respective motor in response to detecting a predetermined acceleration in the rotation of one or more of the wheels. The predetermined acceleration is indicative of a skid.

The predetermined acceleration can be calculated according to a determined upper limit on the acceleration of the vehicle.

A respective control unit can be used to adjust the torque applied to each wheel. Each control unit may perform traction control independently of other control units in the system according to predetermined rules. Wheel acceleration data can be exchanged between the control units. Continuous torque adjustment can be provided for the wheels.

According to a further aspect of the invention, there can be provided a suspension control method for a vehicle comprising a plurality of wheels, each wheel being mounted on a suspension arm of the vehicle and being independently powered by a respective motor. The method includes selectively adjusting a torque applied to each wheel to apply a force to each respective suspension arm.

According to another aspect of the invention, there can be provided a computer program for performing the traction control method and/or the suspension control method described above.

A computer program for implementing the invention can be in the form of a computer program on a carrier medium. The carrier medium could be a storage medium, such as a solid state, magnetic, optical, magneto-optical or other storage medium. The carrier medium could be a transmission medium such as broadcast, telephonic, computer network, wired, wireless, electrical, electromagnetic, optical or indeed any other transmission medium.

Adjusting Seal

Another aspect of the invention is a motor arrangement comprising a stator and a rotor, the stator having a stator housing and the rotor having a rotor housing, the rotor housing substantially surrounding components of the stator and the rotor having a seal arrangement disposed between the rotor housing and the stator housing configured such that a member or members of the seal arrangement is moveable from a position touching the stator housing to a position away from the stator housing due to centrifugal force on rotation of the rotor housing. This arrangement provides the advantage that, when the rotor is stationary or rotating at low speeds, the seal arrangement encloses a gap between the rotor and stator, but when rotating at higher speeds, the seal does not wear out by friction between the seal moving with the rotor and rubbing against the stator housing. At high speeds, ingress of material into the housing is prevented by the centrifugal effect of the rotor. This process is a progressive one in that the pressure between the moveable element or elements of the seal attached to the rotor and the stator housing is highest when stationary and reduces as the rotor speed increases to a level where contact ceases.

The centrifugal action of the rotor also creates a pressure difference internally within the rotor stator assembly. This pressure difference is radial and has low pressure at the centre and higher pressure progressively radially. By incorporation of a suitably protected inlet orifice located near the centre of the stator, air is allowed to be drawn in and subsequently exit at the seal to stator interface. This mechanism provides for an air film that further protects the seal from excessive wear and also provides an additional sealing benefit in that the exiting air precludes material ingress. This feature also provides for the elimination of any water that has entered the motor for example as a result of condensation.

Suitably protected inlet orifice can be for example an orifice with a pipe attached external to the stator. The pipe is long enough to have its other open end located in a position which is certain never to be immersed in water. The open end would further be provided with particle filter to prevent particles of matter greater than a safe size to enter the motor.

Another method of protecting the inlet orifice would be by the use of a semi permeable membrane. Such a membrane would allow air to penetrate without allowing water or particles through ("Goretex" for example). This method can be located at the stator or remotely via a pipe as above.

Cooling Arrangement

A further aspect of the invention is a motor comprising a cooling arrangement. The motor includes a plurality of coils arranged around a circumference and a cooling channel disposed immediately adjacent the plurality of coils through which a coolant fluid may circulate by being pumped or by convective flow. This aspect uses a multi faceted cooling plate, which encloses the windings on three sides and provides faces for the attachment of electronic power devices, a dump power device and a dump resistor. The stator assembly comprising the coils, teeth and back iron is assembled directly onto the cooling plate. The assembly is then potted onto the cooling plate using thermally conductive material, such as epoxy filled with aluminium oxide or aluminium nitride or carbon, for example. This potting process is important due to the mechanical integrity imparted to the whole assembly, all parts are as one and more able to withstand vibration and shock. The potting further improves the electrical strength of the insulation system in that it prevents any air pockets within the winding system. Because of the high switching speeds dv/dt is high and this induces electrical stress in the insulation medium of the windings. Air pockets would risk ionisation and lead to early failure of the insulation. In electronically controlled motors or generators this insulation breakdown brought on by the repeated electrical stress induced through the switching events is a major reliability issue, the potting reduces this risk by a very large degree. Potting is best done under vacuum, but low viscosity potting material can be used in atmospheric pressure. The potting is of importance in improving the thermal conductivity between the heat generating windings and laminations of the back iron and the heat sink cooling plate with it's cooling fluid inside. The potting is further of great benefit in that it allows the winding system to be fully immersed in water with no risk of electrical failure. This is important due to the need to make the electrical system immune to condensation or other water ingress.

BRIEF DESCRIPTION OF THE DRAWINGS

For a better understanding of the invention and to show how the same may be carried into effect reference is now made by way of example to the accompanying drawings in which:

FIG. 19 schematically show examples of a plurality of interconnected back portions stacked in a staggered formation to form a larger back portion;

FIG. 20 schematically show examples of a plurality of interconnected back portions stacked in a staggered formation to form a larger back portion;

FIG. 24 schematically shows the magnet mounting arrangement of an embodiment of the invention.

DETAILED DESCRIPTION

The embodiment of the invention described is an electric motor for use in a wheel of a vehicle. The motor is of the type having a set of coils being part of the stator for attachment to a vehicle, radially surrounded by a rotor carrying a set of magnets for attachment to a wheel. For the avoidance of doubt, the various aspects of the invention are equally applicable to an electric generator having the same arrangement. In addition, some of the aspects of the invention are applicable to an arrangement having the rotor centrally mounted within radially surrounding coils.

Physical Arrangement

Figure 3:
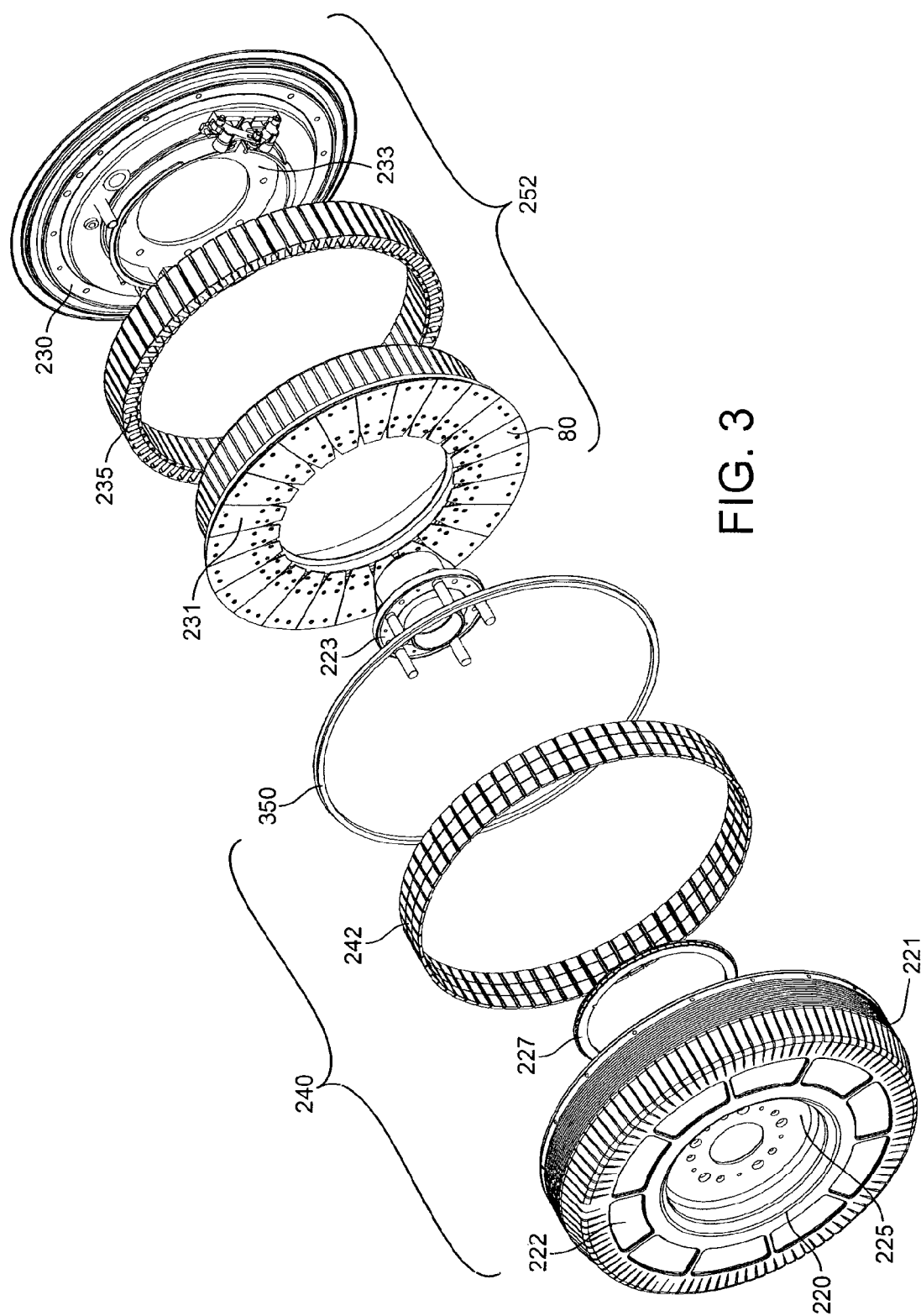
FIG. 3 is an exploded view of a motor embodying the invention.
Figure 4:
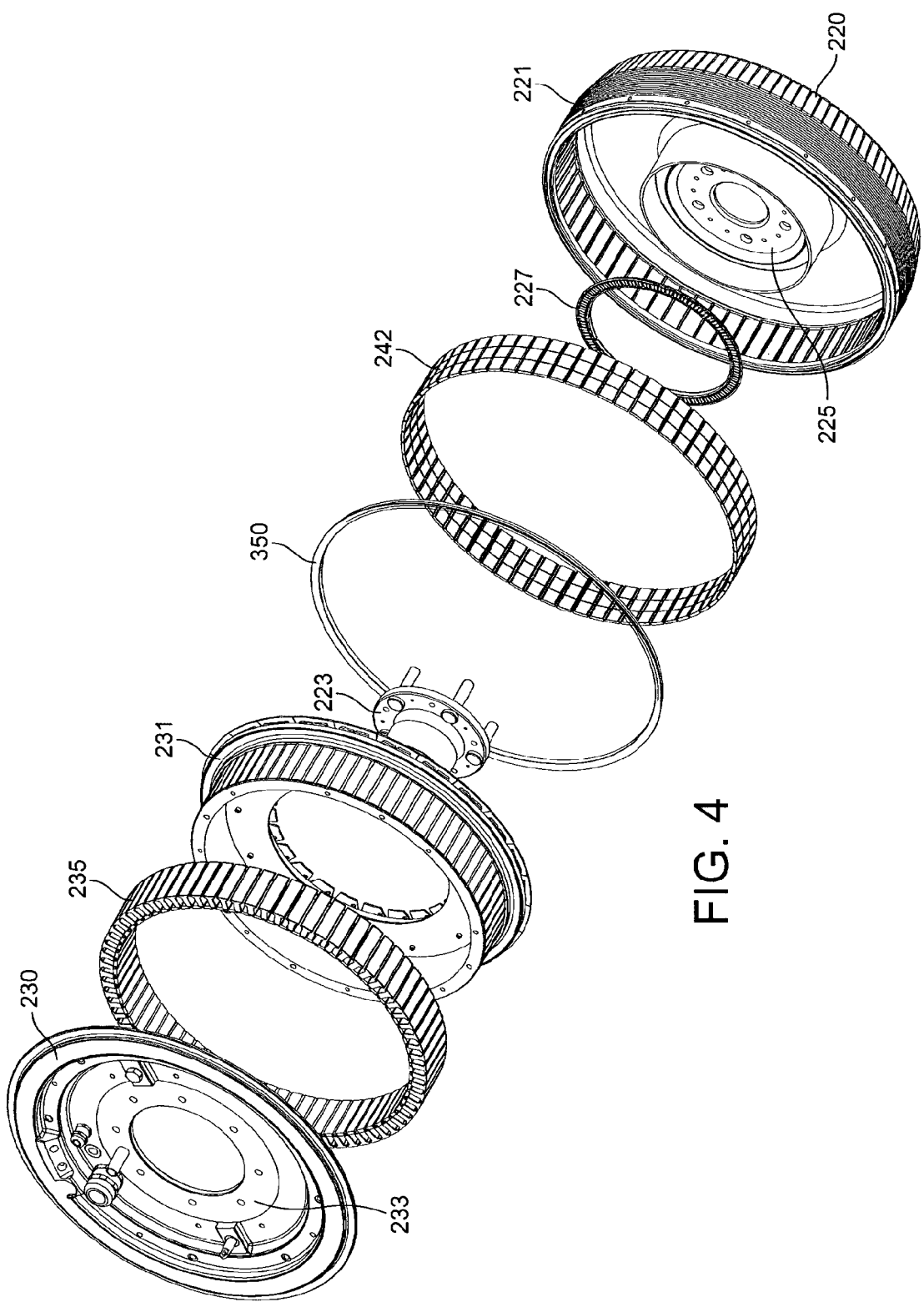
FIG. 4 is an exploded view of the motor of FIG. 3 from an alternative angle.

The physical arrangement of the embodying assembly is best understood with respect to FIGS. 3 and 4. The assembly can be described as a motor with built in electronics and bearing, or could also be described as a hub motor or hub drive as it is built to accommodate a separate wheel.

Referring first to FIG. 3, the assembly comprises a stator 252 comprising a rear portion 230 forming a first part of the housing of the assembly, and a heat sink and drive arrangement 231 comprising multiple coils and electronics to drive the coils as well as a heat sink. The coil drive arrangement 231 is fixed to the rear portion 230 to form the stator 252 which may then be fixed to a vehicle and does not rotate during use. The coils themselves are formed on tooth laminations 235 which together with the drive arrangement 231 and rear portion 230 form the stator 252.

A rotor 240 comprises a front portion 220 and a cylindrical portion 221 forming a cover, which substantially surrounds the stator 252. The rotor includes a plurality of magnets 242 arranged around the inside of the cylindrical portion 221. The magnets are thus in close proximity to the coils on the assembly 231 so that magnetic fields generated by the coils in the assembly 231 generate a force on the magnets 242 arranged around the inside of the cylindrical portion 221 of the rotor 240 thereby causing the rotor 240 to rotate.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 233 of the wall 230 of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has a significant advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. A first advantage of this arrangement is that the whole assembly may be simply retrofitted to an existing vehicle by removing the wheel, bearing block and any other components such as the braking arrangement. The existing bearing block can then fitted inside the assembly and the whole arrangement fitted to the vehicle on the stator side and the normal rim and wheel fitted to the rotor so that the rim and wheel surrounds the whole motor assembly. Accordingly, retrofitting to existing vehicles becomes very simple.

A second advantage is that there are no forces for supporting the vehicle on the outside of the rotor 240, particularly on the circumferential wall 221 carrying the magnets on the inside circumference. This is because the forces for carrying the vehicle are transmitted directly from the suspension fixed to one side of the bearing block (via the central portion of the stator wall) to the central portion of the wheel surrounding the rotor fixed to the other side of the bearing block (via the central portion of the rotor wall). This means that the circumferential wall 221 of the rotor is not subject to any forces that could deform the wall thereby causing misalignment of the magnets. No complicated bearing arrangement is needed to maintain alignment of the circumferential rotor wall.

The rotor also includes a focussing ring and magnets 227 for position sensing discussed later.

FIG. 4 shows an exploded view of the same assembly as FIG. 3 from the opposite side showing the stator 252 comprising the rear stator wall 230 and coil and electronics assembly 231. The rotor 240 comprises the outer rotor wall 220 and circumferential wall 221 within which magnets 242 are circumferentially arranged. As previously described, the stator 252 is connected to the rotor 240 via the bearing block at the central portions of the rotor and stator walls.

Additionally shown in FIG. 3 are circuit boards 80 carrying control electronics described later. Due to their kite shape these circuit boards can be referred to as kite boards. Additionally in FIGS. 3 and 4 a V shaped seal 350 is provided between the circumferential wall 221 of the rotor and the outer edge of the stator housing 230, again described in detail later. Further, in FIG. 4, a magnetic ring 227 comprising a commutation focusing ring and a plurality of magnets is provided for the purpose of indicating the position of the rotor with respect to the stator to a series of sensors arranged on the circuit boards 80 of the stator 252. This is also described in greater detail later.

Coil Control

Figure 5:
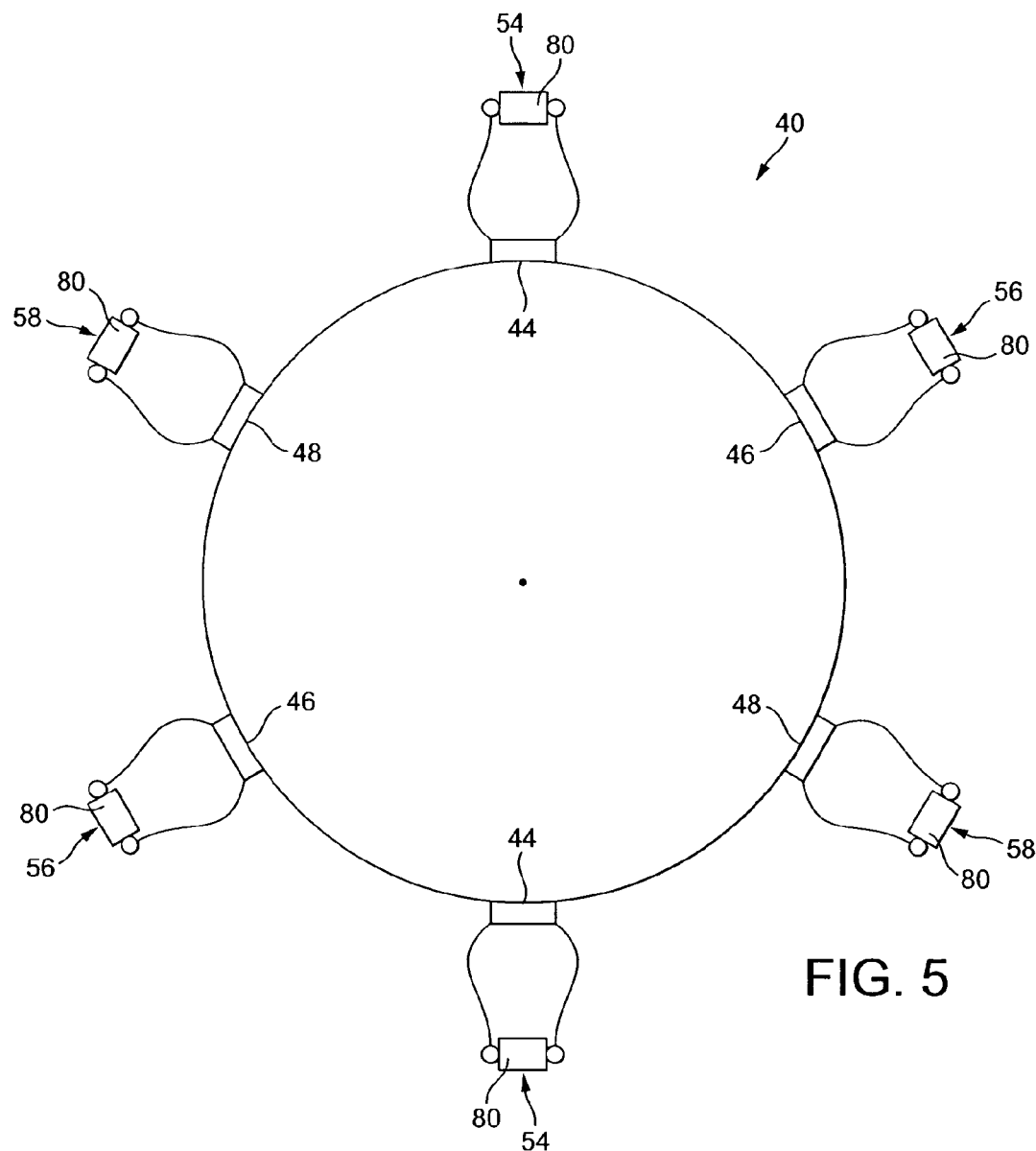
FIG. 5 schematically shows an example coil arrangement for a three phase motor according to an embodiment of this invention.

FIG. 5 schematically shows an example of an electric motor in accordance with an embodiment of this invention. In this example, the motor is generally circular. However, it will be appreciated that embodiments of this invention can employ other topologies. For example a linear arrangement of coils for producing linear movement is envisaged.

The motor 40 in this example is a three phase motor. Again, it will be appreciated that motors according to this invention can include an arbitrary number of phases (N=1, 2, 3 . . . ). Being a three phase motor, the motor 40 includes three coil sets. In this example, each coil set includes two coil sub-sets. The coil sub-sets of each coil set are labelled 44, 46 and 48, respectively. The coil sub-sets 44, 46 and 48 are arranged around a periphery of the motor 40. In this example, each coil sub-set is positioned opposite the other coil sub-set in that coil set, although such an arrangement is not strictly essential to the working of the invention. Each coil sub-set includes one or more coils, as described below in relation to FIG. 6.

The motor 40 can include a rotor (not shown in FIG. 5) positioned in the centre of the circle defined by the positioning of the various coils of the motor, thereby to allow rotation of the rotor within the rotating magnetic field produced by the coil's. Preferably, though, the rotor is arranged around the coils as previously disclosed in FIGS. 3 and 4. The rotor may typically comprise one or more permanent magnets arranged to rotate such that their poles sweep across the ends of the coils of the motor 40. Appropriate switching of currents in the coils of the coil sub-sets allows synchronized attraction and repulsion of the poles of the permanent magnet of the rotor to produce the rotating action of the motor 40. It will be appreciated that FIG. 5 is highly schematic and, in practice, the coil sub-sets will be arranged at the outer periphery of the stator with the rotor magnets surrounding the coils.

Figure 6:
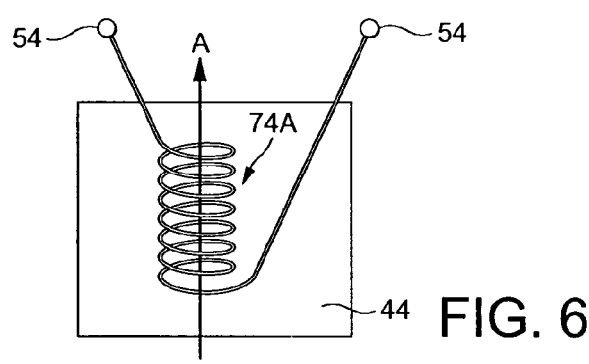
FIG. 6 schematically shows an example arrangement of coils in one of the coil sub-sets shown in FIG. 3 according to an embodiment of the invention.

Each coil set 44, 46, 48 includes one or more coils. As shown in FIG. 6, in the present example, there is a single coil per coil sub-set. An example with more than one coil per coil sub-set is described below in relation to FIGS. 7 and 8. Where more than one coil is provided in a given coil sub-set, these coils can generally be wound in opposite directions such that the magnetic field produced by each coil is in an anti-parallel configuration with respect to the magnetic field in an adjacent coil. As described above, appropriate switching of the current in the coils causes the permanent magnets of the rotor to rotate.

As shown in FIG. 5, in accordance with an embodiment of this invention, the coil or coils of each coil sub-set can be connected to a separate control device 80. In FIG. 5, it is schematically shown that each coil sub-set is connected to the terminals 54, 56, 58 of respective control devices 80. Accordingly, the coils of corresponding coil sub-sets within a given coil set are not connected in series. Instead, each coil sub-set is individually controlled and powered. The connections to the control device and the coils of each coil sub-set can be formed using, for example, a single piece of wire (e.g. copper wire) as is shown schematically in FIG. 6. There are numerous advantageous to providing individual power control for the coils of each coil sub-set.

Since there is no need to run connecting wires around the periphery of the motor providing series interconnections for the coils of each coil sub-set, less wire is used in manufacturing the motor. This reduces manufacturing costs as well as reducing the complexity of the motor construction. The reduction in wire also reduces conduction losses.

By providing individual power control for the coils of each coil sub-set, and by using a larger number of turns per coil than would be achievable using a motor in which the coils of each coil sub-set are connected in series, the total inductance of the motor can be greatly increased. In turn, this allows far lower current to be passed through each coil sub-set whereby switching devices having a lower power rating can be used for current control. Accordingly, switching devices which are, cheaper, lighter and less bulky can be used to operate the motor.

The use of lower currents also reduces heat dissipation problems and lowers switching losses due to the faster speed of the smaller switching devices which can be employed. The fact that smaller switching devices can operate at higher frequencies allows for finer and more responsive motor control. Indeed, torque adjustment can take place on the basis in a highly responsive manner, with adjustments being able to be made within a single PWM period. A typical PWM period according to an embodiment of the invention is approximately 50 µs.

Another advantage of the use of smaller switching devices is that they can be located proximal the coils which they control. In prior electric motors, where relatively large switching devices have been employed to control the operation of coil sub-sets connected in series, the control device is sufficiently large that it can not be included with the other motor components (e.g. stator, rotor, etc.) but instead has been provided separately. In contrast, since small switching devices can be used, in accordance with an embodiment of this invention the switching devices and the control devices in which those switching devices are incorporated can be located in, for example the same housing/casing as the other motor components. Further detail regarding an example of a control device incorporating switching devices is given below in relation to FIGS. 10 and 11.

Figure 7:
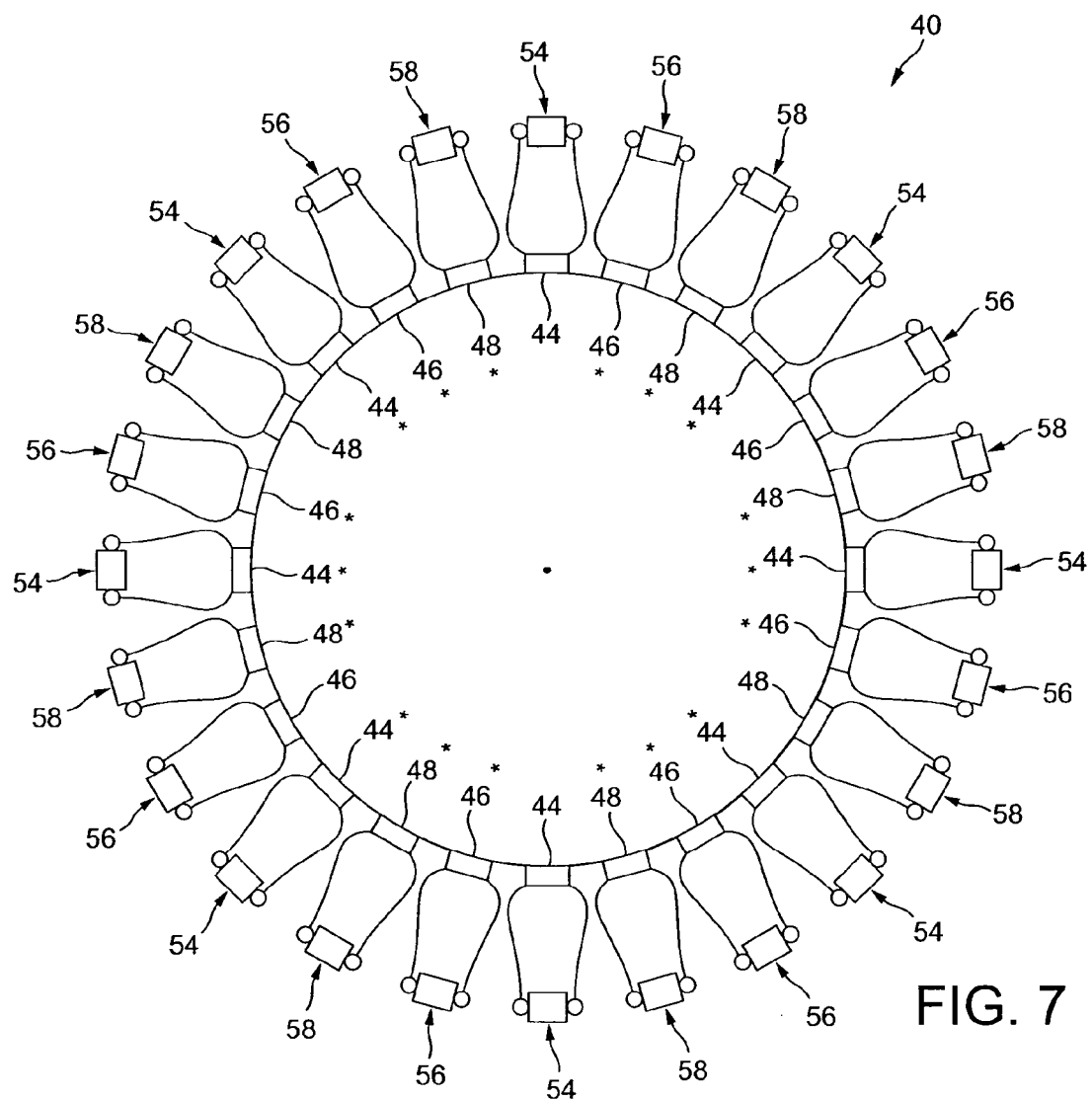
FIG. 7 schematically shows schematically shows an example arrangement for a three phase motor according to an embodiment of this invention.
Figure 8:
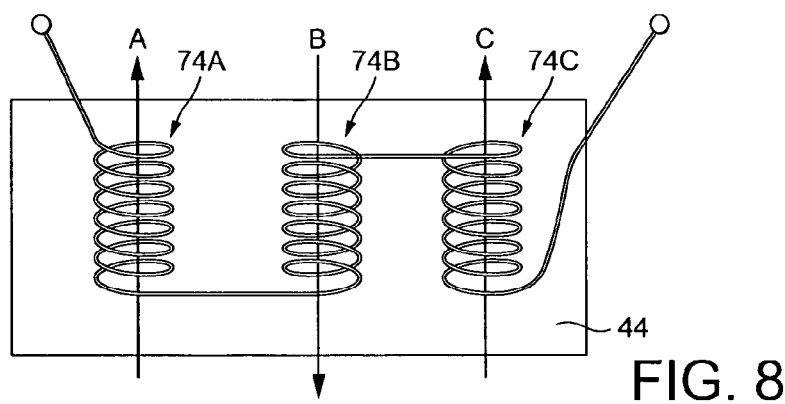
FIG. 8 schematically shows an example arrangement of coils in one of the coil sub-sets shown in FIG. 7 according to an embodiment of the invention.

FIGS. 7 and 8 show another example arrangement for a motor 40 in accordance with an embodiment of this invention. The motor 40 shown in FIG. 5 is a three phase motor. The motor therefore has three coil sets. In this example, each coil set includes eight coil sub-sets. The coil sub-sets of each coil set are labelled 44, 46 and 48, respectively in FIG. 7. In common with the example described above in relation to FIG. 5, each coil set includes pairs of coil sub-sets which are arranged opposite each other around the periphery of the motor 40. Again, however, it should be noted that there is no express need for each coil sub-set to have a corresponding coil sub-set located opposite from it on the opposite side of the periphery of the motor 40.

As described above in relation to FIG. 7, each coil sub-set can be connected to a respective control device 80. The terminals for each coil sub-set of each coil set are labelled 54, 56 and 58, respectively in FIG. 7. While the arrangement shown in FIG. 7 includes a larger number of coil sub-sets than, for example, the arrangement shown in FIG. 3, this does not significantly increase the size and bulk of the switching means which are used to operate the motor as would be the case if the increased number of coil sub-sets were connected together in series. Instead, it is merely necessary to provide an additional control device 80 incorporating relatively small switching devices as described above for each additional coil sub-set. As described above, these control devices 80 are sufficiently small such that they can be located adjacent to their corresponding coil sub-sets within, for example, the same casing as the motor 40.

As described above, each coil sub-set can include one or more coils. In this example, each coil sub-set includes three coils as is shown schematically in FIG. 8. In FIG. 8, these three coils are labelled 74A, 74B and 74C. The three coils 74A, 74B and 74C are alternately wound such that each coil produces a magnetic field which is anti-parallel with its adjacent coil/s for a given direction of current flow. As described above, as the permanent magnets of the rotor of the motor 40 sweep across the ends of the coils 74A, 74B and 74C, appropriate switching of the currents in the coils can be used to create the desired forces for providing an impulse to the rotor. As is shown schematically in FIG. 6, each coil in a coil sub-set can be wound in series.

Figure 9:
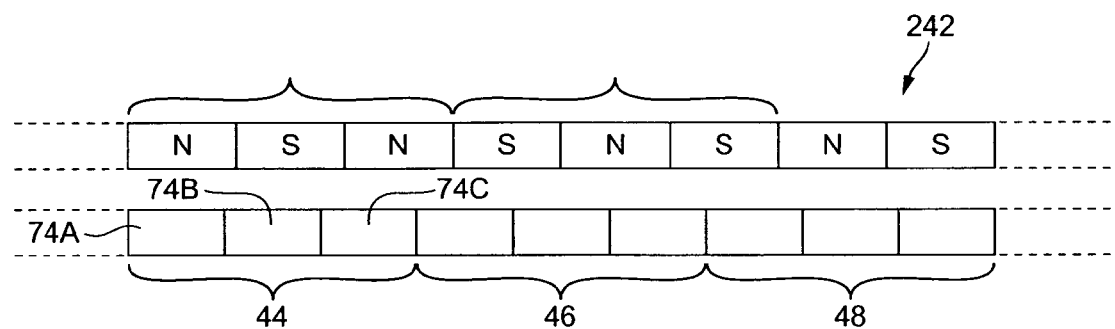
FIG. 9 schematically shows the coils of the embodiment in relation to the magnets.

The reason that the coils 74A, 74B and 74C within each subset are wound in opposite directions to give antiparallel magnetic fields can be understood with respect to FIG. 9 which shows the arrangement of the magnets 242 on the rotor surrounding the coils 44, 46 and 48 of the stator. For simplicity, the arrangement is shown as a linear arrangement of magnets and coils, but it will be understood that in the embodiment of the invention described the coils will be arranged around the periphery of the stator with the magnets arranged around the inside of the circumference of the rotor, as already described.

The magnets 242 are arranged with alternate magnetic polarity towards the coil subsets 44, 46 and 48. Each subset of three coils 74A, 74B and 74C thus presents alternate magnetic fields to the alternate pole faces of the magnets. Thus, when the left-hand coil of a subset has a repelling force against a North Pole of one of the magnets, the adjacent central coil will have a repelling force against a South Pole of the magnets and so on.

As shown schematically in FIG. 9, the ratio of magnets to coils is eight magnets to nine coils. The advantage of this arrangement is that the magnets and coils will never perfectly align. If such perfect alignment occurred, then the motor could rest in a position in which no forces could be applied between the coils and the magnets to give a clear direction as to which sense the motor should turn. By arranging for a different number of coils and magnets around the motor, there would always be a resultant force in a particular direction whatever position the rotor and motor come to rest.

A particular benefit of the independent control of the coil subsets by the separate control devices is that a larger than normal number of phases can be arranged. For example, rather than a three phase motor, as described in FIG. 7, higher numbers of phases such as twenty-four phase or thirty-six phase are possible with different numbers of magnets and coils. Ratios of coils to magnets, such as eighteen coils to sixteen magnets, thirty-six coils to thirty-two magnets and so on, are perfectly possible. Indeed, the preferred arrangement, as shown in FIGS. 3 and 4 is to provide 24 separate control "kite" boards 80, each controlling three coils in a sub-set. Thereby providing a twenty-four phase motor. The use of a multiphase arrangement, such as twenty-four phases, provides a number of advantages. The individual coils within each sub-set can have a larger inductance than arrangements with lower numbers of phases because each control circuit does not have to control large numbers of coils (which would require controlling a large aggregate inductance). A high number of phases also provides for lower levels of ripple current. By this it is meant that the profile of the current required to operate the motor undulates substantially less than the profile from, say a three-phase motor. Accordingly, lower levels of capacitance are also needed inside the motor. The high number of phases also minimize the potential for high voltage transients resulting from the need to transfer large currents quickly through the supply line. As the ripple is lower, the impact of the supply cabling inductance is lower and hence there is a reduction in voltage transient levels. When used in a braking arrangement (described later), this is a major advantage, as in hard braking conditions, several hundred kilowatts need to be transferred over several seconds and the multiphase arrangement reduces the risk of high voltage transients in this situation.

The relative arrangement of magnets and coils, shown in FIG. 9 can be repeated twice, three times, four times or indeed as many times as appropriate around 360 mechanical degrees of the rotor and stator arrangement. The larger the number of separate sub-sets of coils with independent phases, the lower the likelihood of high voltage transients or significant voltage ripple.

In accordance with an embodiment of this invention, a plurality of coil sub-sets with individual power control can be positioned adjacent each other in the motor. In one such example, three coils such as those shown in FIG. 8 could be provided adjacent each other in a motor but would not be connected in series to the same control device 80. Instead, each coil would have its on control device 80.

Where individual power control is provided for each coil sub-set, the associated control devices can be operated to run the motor at a reduced power rating. This can be done, for example, by powering down the coils of a selection of the coil sub-sets.

By way of example, in FIG. 7 some of the coil sub-sets are highlighted with a '*'. If these coil sub-sets were to be powered down, the motor would still be able to operate, albeit with reduced performance. In this way, the power output of the motor can be adjusted in accordance with the requirements of a given application. In one example, where the motor is used in a vehicle such as a car, powering down of some of the coil sub-sets can be used to adjust the performance of the car. In the example shown in FIG. 7, if each of the coil sub-sets indicated with an '*' were powered down, the remaining coil sub-sets would result in a configuration similar to that shown in FIG. 5, although of course there are three coils per coil sub-set as opposed to the single coil per coil sub-set shown in FIG. 5.

Powering down of one or more of the coil sub-sets has the further benefit that in the event of a failure of one of the coil sub-sets, other coil sub-sets in the motor 40 can be powered down resulting in continued operation of the motor 40 in a manner which retains a balanced magnetic field profile around the periphery of the motor for appropriate multiphase operation. In contrast, in prior systems involving series interconnection of the coils of the coil sub-sets, a failure in the coils or interconnections associated with any given coil set is likely to be catastrophic and highly dangerous, given the large currents involved. Moreover, a failure anywhere within the coils or interconnections between the coils of a given coil set would result in the motor not being able to continue functioning in any way whatsoever.

In summary, individual power control for the coil sub-sets in accordance with an embodiment of this invention allows independent powering up and or powering down of selected coil sub-sets in order to react to differing powering requirements and/or malfunctions or failures within the coil sub-sets.

Control Circuitry

Figure 10:
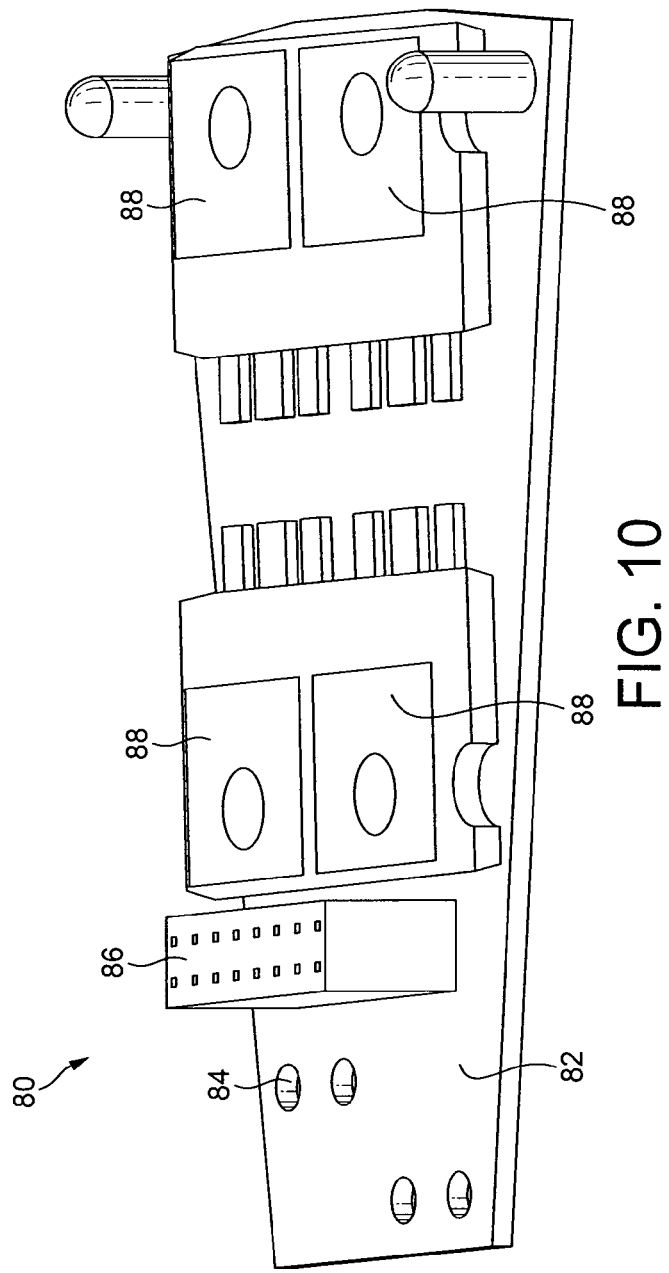
FIG. 10 schematically shows an example of a control device in accordance with an embodiment of this invention.

FIG. 10 shows an example of a control device 80 in accordance with an embodiment of this invention. As described above, the control device 80 includes a number of switches which may typically comprise one or more semiconductor devices. The control device 80 shown in FIG. 10 includes a printed circuit board 82 upon which a number of components are mounted. The circuit board 82 includes means for fixing the control device 80 within the motor, for example, adjacent to the coil sub-set which it the controls—directly to the cooling plate. In the illustrated example, these means include apertures 84 through which screws or suchlike can pass. In this example, the printed circuit board is substantially wedge-shaped. This shape allows multiple control device 80 to be located adjacent each other within the motor, forming a fan-like arrangement.

Mounted on the printed circuit board 82 of the control device 80 there can be provided terminals 86 for receiving wires to send and receive signals from a 92 control device as described below.

In the example shown in FIG. 10, the control device 80 includes a number of switches 88. The switches can include semiconductor devices such as MOSFETs or IGBTs. In the present example, the switches comprise IGBTs. Any suitable known switching circuit can be employed for controlling the current within the coils of the coil sub-set associated with the control device 80. One well known example of such a switching circuit is the H-bridge circuit. Such a circuit requires four switching devices such as those shown in FIG. 10. The wires (e.g. copper wires) of the coil sub-sets can be connected directly to the switching devices 88 as appropriate, and interconnections between the switching devices 88 can be formed on the printed circuit board 82. Since the switching devices 88 can be located adjacent the coil sub-sets as described above, termination of the wires of the coil sub-sets at the switching devices 88 is made easier.

Figure 11:
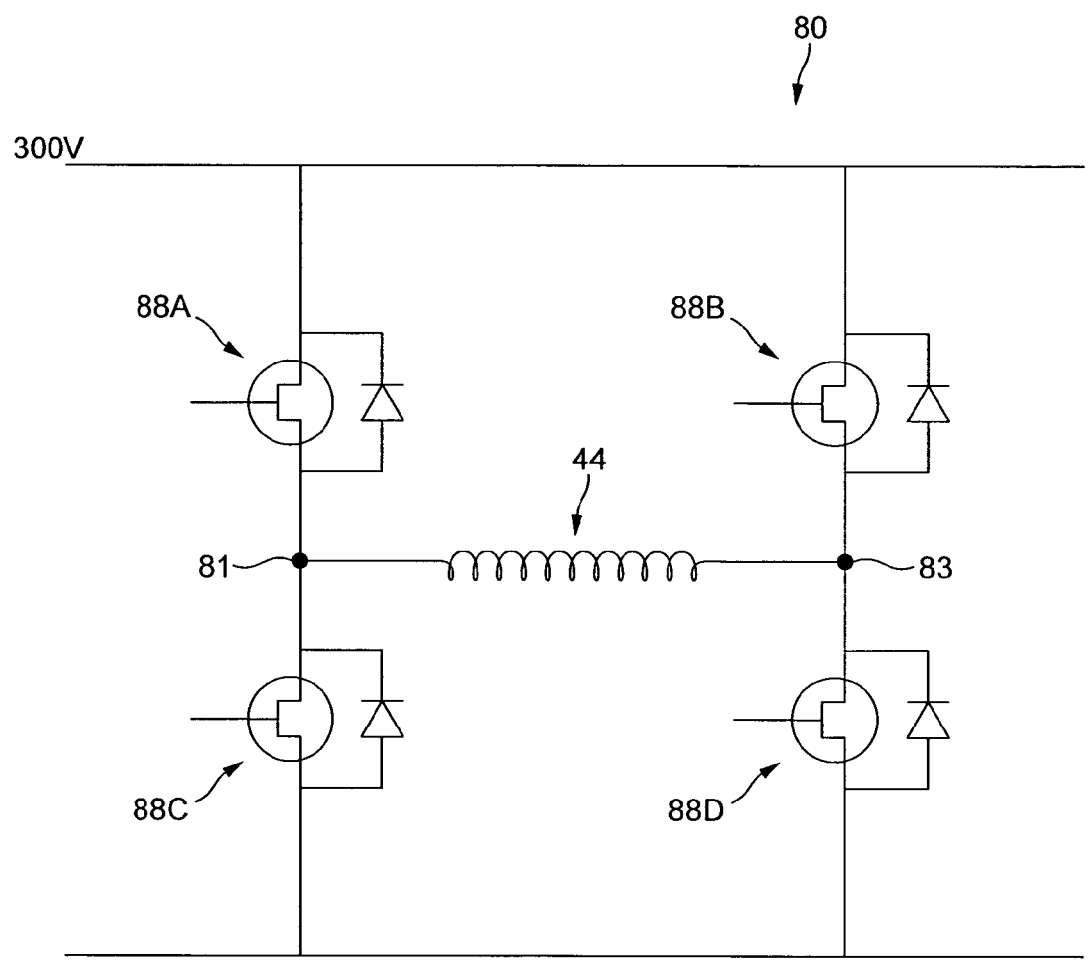
FIG. 11 is a circuit diagram of the switching arrangement.

As shown in FIG. 11, the control device includes semiconductor switches arranged in an H-bridge arrangement. The H-bridge is of course known to those skilled in the art and comprises four separate semiconductor switches 88 connected to a voltage supply (here 300 volts) and to ground. The coils of each sub-coil are connected across the terminals 81 and 83. Here a sub-coil 44 is shown connected across the terminals. Simplistically, to operate the motor and supply a voltage in one direction, switches 88A and 88D are closed and the other switch is left open, so that a circuit is made with current in one direction. To operate the motor this current direction is changed in harmony with the alternating magnetic polarity passing the coil. To change the direction of rotation of the motor, the timing and polarity of the current flow in the coil is changed to cause the resulting forces in the opposite direction. The direction of current flow in the coil is reversed when switches 88B and 88C are closed and the other two switches are left open. In practice, the technique of pulse width modulating is used to pulse width modulate the signal applied to the gate of the semiconductor switches to control the voltage applied to the coils. The braking arrangement operates in a manner not known in the prior art and will be described after describing the overall control arrangement.

Figure 12:
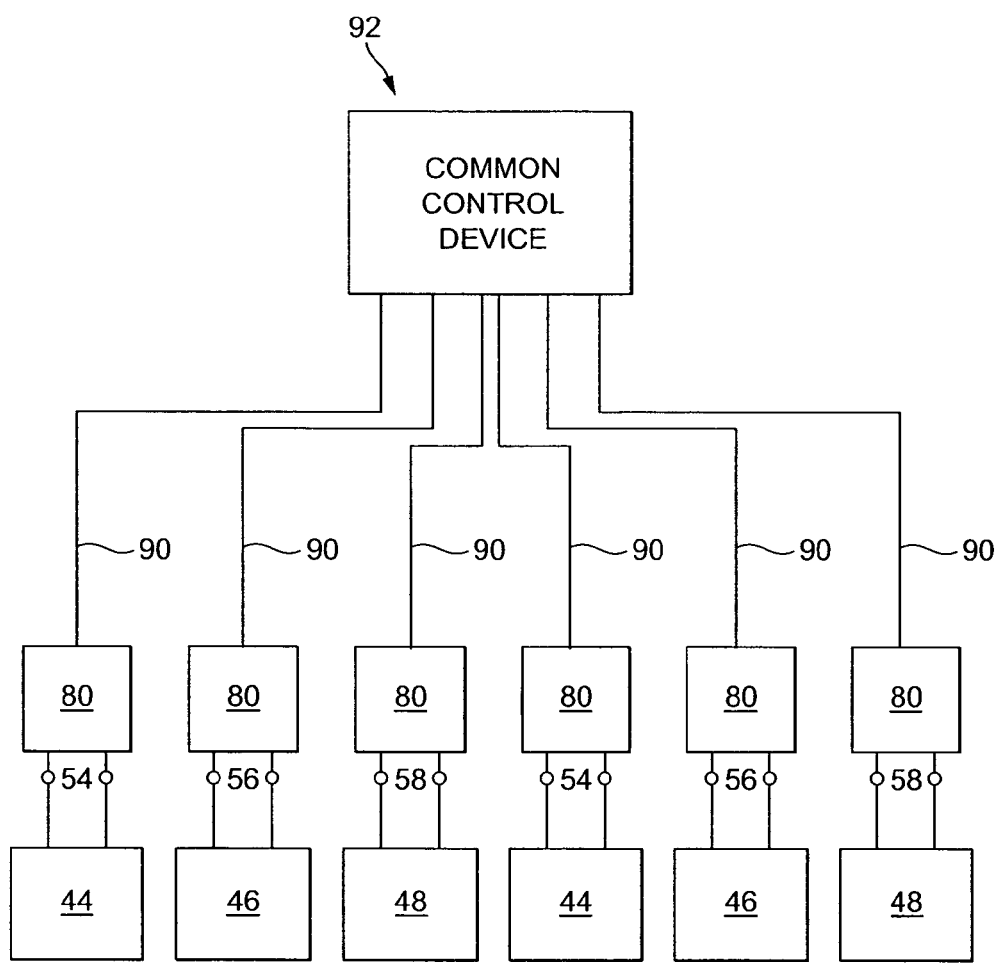
FIG. 12 schematically shows an arrangement in which a common control device is used to coordinate the operation of a plurality of control devices.

As shown in FIG. 12, a common control device 92 can be used to coordinate the operations of the multiple control devices 80 provided in the motor. In prior motors, in which synchronization of the magnetic fields produced by the coils of each coil sub-set is automatically achieved by virtue of the fact that they are connected in series. However, where separate power control is provided for each coil sub-set, automatic synchronization of this kind does not occur. Accordingly, in accordance with an embodiment of this invention, a common control device 92 such as that shown in FIG. 12 can be provided to ensure correct emulation of a polyphase system incorporating series-connected coils. As described above in relation to FIG. 11, terminals 86 can be provided at the multiple control devices 80 to allow interconnections 90 to be formed between the multiple control devices 80 and the common control device 92.

The interconnections 90 can pass signals between the common control device 92 and the control devices 80 such as timing/synchronization signals for appropriate emulation of a polyphase series-connected system.

In an alternative embodiment, each control unit can operate independently, without the need of a central control device. For example, each control unit can have independent sensors to detect a position of a rotor of the motor, which would dispense with the need to provide synchronisation signals of the kind described above. Instead, each control unit would receive a demand signal enabling it to control the voltage applied to its associated coils in isolation.

It is stressed that the preferred embodiment does not require any form of central control device for the operation of each wheel incorporating a motor. Preferably, each motor is self-contained and, within each motor, the control circuits 80 are self-contained and depend upon nothing other than a torque demand signal to operate. This means that the elements are able to continue to function and to deliver demanded torque levels, irrespective of any other failures within the total drive system. In a system incorporating a plurality of wheels each having a motor, each motor incorporates all the intelligence needed to manage its actions. Each motor understands its position on the vehicle and controls its actions accordingly. Preferably, each motor is further provided with information regarding the other motors such as the speed, torque and status and are based on each motor's knowledge of its position on the vehicle and the state and status of the other motors it can determine the optimum level of torque that it should apply for a given demanded torque. Even without this other information, though, the motor can continue to respond to a demanded torque.

Other control signals such as power up/power down control signals can also be sent/received via the interconnects. These signals can also include signals for adjusting/defining the voltage pulses applied by the control device 80 to the coils of its associated coil sub-set for powering the motor.

For example, in accordance with an embodiment of this invention, means can be provided for monitoring a back EMF within the coil or coils of a coil sub-set. The task of emulating a motor with series connected coil sub-sets as described above is complicated by virtue of the back EMF associated with the motor. In a series connected system, the back EMFs are also in series and this gives rise to a smooth sine wave back EMF profile. Accordingly, in a series configuration the sinusoidal back EMF minimises the bandwidth required from the drive electronics when controlling the current in the coils.

In contrast, the reduced number of coil sub-sets connected in series in accordance with an embodiment of this invention can result in a non sinusoidal back EMF. Accordingly a more agile control system is desirable in order to ensure that the currents in the coils remain sinusoidal.

According to an embodiment of this invention, near instantaneous compensation can be provided for back EMF and further adjusting for any variations in a system dc supply voltage. The means for measuring the back EMF can include a current sense device fitted to provide feedback of the actual current flowing in the coil or coils of each coil sub-set. In one example, a simple series resistor of suitably low value in series with the switching devices can be employed. For example, in one embodiment two resistors can be provided in the bottom emitter of a "H" bridge power stage.

As the back EMF changes with rotor angle and rotor velocity, this results in a change in the rate of change of current in the coil. This rate of change of current can be detected across a resistor or other current sense device as a change in voltage. This change can then be differentiated to produce a voltage which is proportional to the back EMF.

Similarly, the supply voltage can be applied to a capacitor at the start of each PWM period. The resulting voltage ramp can be added to the back EMF signal and combined as a feed forward term to modify the current PWM period up or down. Thus both supply variation and back EMF changes substantially instantly adjust the PWM period and hence voltage applied to the coil, resulting in rapid adjustment of coil current to follow the demanded value.

In a further example, a sense coil can be provided. Sense coils can be provided around, for example, a sub-set of coil teeth of the kind described below. The sense coil then can be monitored at appropriate times for the back EMF voltage. This in turn can be used in a similar manner as described above to feed forward a term to adjust PWM period in mid-cycle, response to the magnitude of the back EMF.

In embodiments where each drive module generates its own PWM signal, back EMF correction thus can take place in a manner which is not synchronised with the other modules resulting in a distributed random spread spectrum. Alternatively the control devices can have their PWM generators synchronised by an off board device such as the common control device 92.

The control device can also optionally include means for monitoring a temperature within the motor, for example within the coils sub-set associated with that control device 80. The control device can be configured automatically to respond to the temperature measurement to, for example, reduce power to the coils sub-set to avoid overheating. Alternatively, the temperature measurement can be passed onto the common control device 92 from each control device 80, whereby the common control device 92 can monitor the overall temperature within the motor and adjust the operation of the control devices 80 accordingly.

Noise Reduction

In accordance with an embodiment of the invention, EMI noise can be reduced by providing for staggered switching of the switches within each control device 80. By including a slight delay between the switching of the various switching devices in the motor, a situation can be avoided in which a large number of switching events occur in a short amount of time, leading to a peak in EMI noise. Thus, the staggering of the switching within the switches 88 of the control devices 80 can spread the EMI noise associated with the switching events during operation of the motor across a wider time period thereby avoiding an EMI noise peak. This kind of spreading of the switching events can be coordinated locally at the individual control devices 80 or could alternatively be coordinated by the common control device 92 using adjusted timing signals sent via the interconnections 90.

Power Supply

Although the control devices 80 described in this application can provide individual power control for the coils of each coil sub-set in a motor, and although this may be achieved using various kinds of switching devices and arrangements, the control device system cells can be coupled to a common power source such as a DC power supply. A particularly useful arrangement for the DC power supply is to provide a circular bus bar. Because the control circuit 80 are arranged in a ring, the DC power feed may also be arranged as a ring. This provides increased safety in that there is a current path around each side of the ring (in the same way as a domestic ring main) and so breakage of the DC supply at one point will not prevent power reaching the control circuits. In addition, because current can flow from the source power supply to each control circuit by two routes through the circular bus bar, the current demand on the bus bar is halved.

Braking Arrangement

A number of the features already described provide a significant advantage when implemented in a motor within a vehicle wheel in providing a safe mechanism for applying a braking force and thereby avoid the need for a separate mechanical braking arrangement. The motor itself can provide the braking force and thereby return energy to the power supply, such that this arrangement may be termed "regenerative" braking. When operating in this mode, the motor is acting as a generator.

The braking arrangement makes use of the considerable redundancy built into the motor assembly as a whole. The fact that each separate coil sub-set 44, shown in FIGS. 7 and 8, is independently controlled by a switching circuit 80 means that one or more of the switching circuits may fail without resulting in a total loss of braking force. In the same way that the motor is able to operate with reduced power when providing a driving force by intentionally switching some of the switching circuits to be inoperable, the motor can operate with a slight reduction in braking force if one or more of the switching circuits fail. This redundancy is inherent in the design already described but makes the motor a very effective arrangement for use in a vehicle, as it can replace both the drive and braking arrangement.

A further reason why the motor assembly can provide an effective braking arrangement is in relation to the handling of power. As already mentioned, the use of multiple independently controlled coils means that the current through each coil when operating in a generating mode need not be as high as the current through an equivalent arrangement with fewer phases. It is, therefore, simpler to deliver the power generated by the coils back to the power source.

To ensure safe operation of the braking arrangement, even in the event of failure of the power source, the circuitry 80 for each individual coil sub-set is itself powered by an electricity supply derived from the wheel itself. As the wheel rotates, it generates a current as the magnets pass the coils. If the power supply fails, this current is used to supply power to the switches 80.

A further redundancy measure is in providing separate physical sensors connected to the brake pedal (or other mechanical brake arrangement) of the vehicle, one sensor for each wheel. For example, in a typical four-wheeled car, four separate brake sensor arrangements would be physically coupled to the brake pedal with four separate cables going to the four separate motors. Accordingly, one or more of these separate electrical sensors connected to the mechanical brake pedal or, indeed, the separate cables could fail and still one or more of the wheels will be controlled to operate a braking force. By virtue of the ability of the control units to communicate with each other, software features allow the failure of any sensor or it's cable to have no effect on the motor operation. This is achieved by each motor being able to arbitrate the sensor information and use the sensor data from the other motors if it's sensor data is disparate with the other three sensors.

A yet further redundancy measure is the use of a so-called dump resistor. In the event of failure of the power supply, the energy generated by the wheel, when providing a braking force, needs to be dissipated. To do this, a resistance is provided through which the electrical power generated by the wheel may be dissipated as heat. The use of the multiphase design with separate electrical switching of each sub-coil allows the use of distributed resistance, so that each sub-coil may dissipate its power across a resistance and the dump resistance as a whole may therefore be distributed around the wheel. This ensures that the heat thereby generated can be evenly dissipated through the mass of the wheel and the cooling arrangement.

Referring again to FIG. 11, the mode of operation of the switch 80 for each coil sub-set 44 is as follows when in a braking mode. The upper switches 88A and 88B are opened and switch 88C operated in on/off pwm mode to control the voltage generated by the coil. As the magnet passes the coil sub-set 44, the voltage at connection point 83 rises. When the switch 88C is then opened as part of the pwm process, the voltage at point 83 rises to maintain the coil current and so energy is returned to the power supply (via the diode across switch 88B). This arrangement effectively uses the coils of the motor itself as the inductor in a boost form of DC-to-DC converter. The switching of the controls in the H bridge circuit controls the DC voltage that is provided back to the power source.

The boost type dc/dc converter switching strategy employed for regenerative braking has a further distinct advantage in that it reduces battery loading. In known systems regenerative mode operates by switching the top switches to provide the battery volts in series with the motor coil and its back emf. This requires the current to be established through the battery. Hence even though the coil is generating, it depletes the battery state of charge by virtue of its current having to flow through the battery in the discharge direction. By employing the DC- to DC converter arrangement described above, the coil establishes its current locally by an effective short circuit across the coil, created by the bottom switches. When the generated current is established it is then directed back to the battery in the charge direction. So whilst both regimes collect the transient energy when the bottom switch turns off in the normal pwm sequence, the conventional system consumes battery current whilst establishing the generated current flow, whereas the arrangement here described consumes no battery current.

When the voltage generated by the coil falls below say four volts, the current can no longer flow due to the voltage dropped across the switches or diodes used within the H bridge circuit. In the embodiment, a voltage of approximately 1.75 volts per mile per hour is generated and so at speeds below 3 miles per hour, this situation arises. At this speed, the switching strategy changes to a form of DC plugging. In DC plugging the phase of all voltages is arranged to be the same. This common phase of all voltages results in the removal of rotation force and the application of a static force. The static force attempts to hold the rotor in one position. Thus normal pwm control is used but with each coil subset having it's applied voltage in phase with all others. This DC mode of operation is particularly beneficial at low speeds, as it ensures safe stopping of the vehicle. When the vehicle has come to a complete rest, the vehicle will stay at rest, as any movement of the rotor is resisted by the static field. There is thus no risk that the motor would accidentally move forwards or backwards.

The dump resistor arrangement already described may also be used in the event that the battery is simply full and energy needs to be dissipated when braking. If the voltage across the supply goes over a given threshold then energy may be switched to the dump resistor.

Embodiments of this invention can provide a highly reliable motor or generator, at least in part due the separateness of the power control for the coil sub-sets as described above. Accordingly, a motor or generator according to this invention is particularly suited to applications in which a high degree of reliability is required.

A further safety feature, particularly beneficial when incorporated in a vehicle, is that the motor can supply power not only to the switches within the motor, but also to remote aspects of a whole system, including a master controller processor, shown as common control device 92, in FIG. 12, and to other sensors, such as the break pedal sensor. In this way, even if there is a total failure of power supply within the vehicle, the braking arrangement can still operate.

For example, applications such as wind turbines depend for their success and take up on cost and reliability. Typical turbine systems will run for 25 years and ideally should require minimum in service down time for maintenance/breakdown etc. By incorporating the drive electronics into a compact form with compact windings, as can be achieved according to an embodiment of this invention, the total system cost can be minimised. In accordance with an embodiment of this invention, independent power control of the coil sub-sets can allow continued operation even under partial failure the system.

In particular vertical axis turbines which are recently growing in popularity due to their efficient operation can benefit from the incorporation of a motor according to this invention. This is because of the high power to weight ratio which can be achieved, which allows for lower mast head mass and hence less cost for support column/structure.

Military, marine aircraft and land based drive systems are all currently less reliable than would be desired due to the dependence on single device reliability in classic 3 phase bridge topologies. Again, using a motor according to an embodiment of this invention, the reliability of such vehicles could be improved.

It will be clear from the foregoing description that electric motors generally include a complex arrangement of interconnections and windings. As described above, the manufacture of an electric motor incorporating such features is a laborious and time consuming process. The time and effort which is required to construct an electric motor is generally exacerbated by the use of, for example, copper wire for the windings and interconnections. Wire of this kind is often relatively thick (in order to be able to handle high currents) and is difficult to manipulate. Damage to electric insulation provided on the wire can be difficult to avoid during motor construction, again due to the difficulty in manipulating the wire. Access to the relevant parts of a motor for installing the windings and interconnections is often limited and inhibited by other components of the motor.

Coil Mounting

Figure 13:
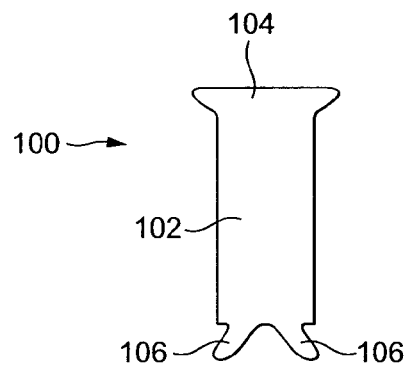
FIG. 13 schematically shows a front view of a coil tooth in accordance with an embodiment of the invention.
Figure 14:
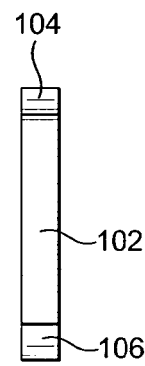
FIG. 14 schematically shows a side view of a coil tooth in accordance with an embodiment of the invention.
Figure 15:
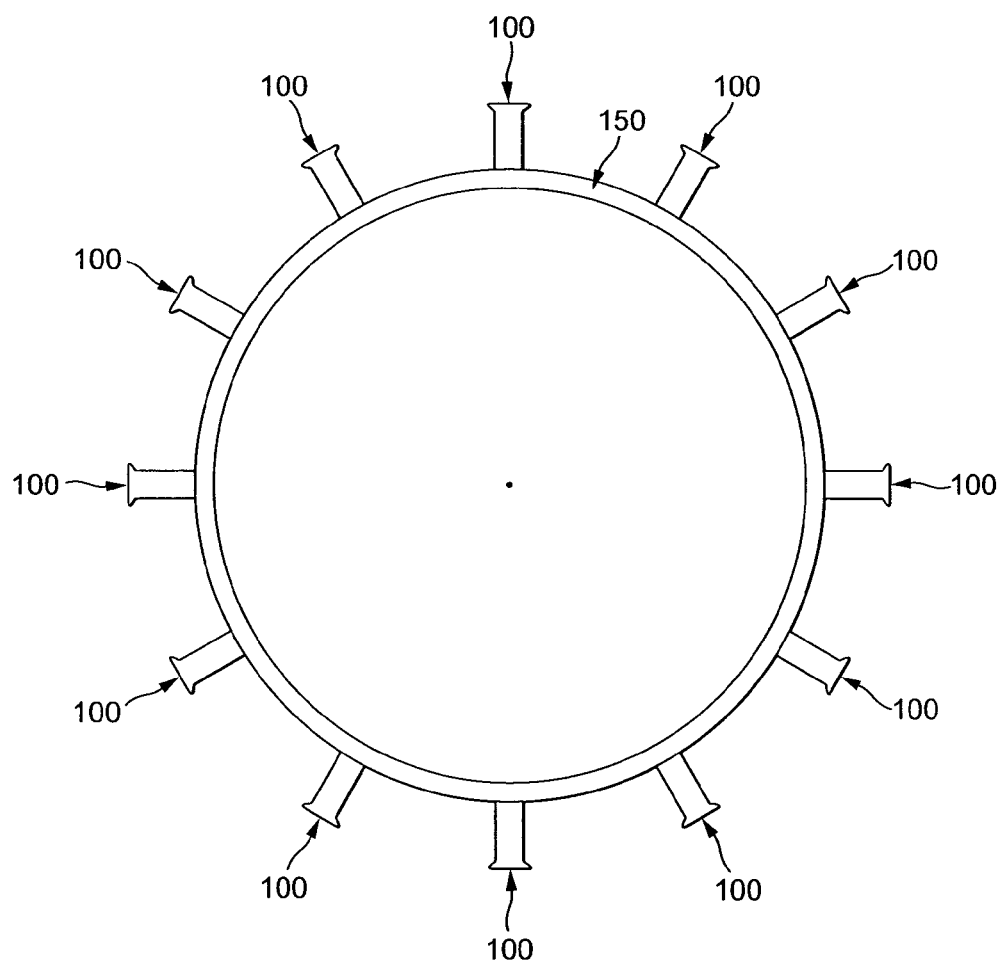
FIG. 15 schematically shows a back portion with a number of coil teeth receivably attached thereto in accordance with an embodiment of the invention.

FIGS. 13 to 18 schematically show an example of a coil mounting system for an electric motor or indeed for an electric generator which allows easier construction and assembly of a motor. As shown in FIG. 15, the coil mounting system includes a back portion 150 and a plurality of coil teeth 100, which are interspersed around a periphery of coil mounting portion 150. The teeth are positioned such that they can receive the windings of motor coils to produce the desired N-phase motor. The arrangement of teeth shown in FIG. 11, for example, could be used to construct a three phase electric motor of the kind described above.

The coil teeth 100 are shown in more detail in FIGS. 13 and 14. FIG. 13 shows a front view of a coil tooth and FIG. 14 shows a side view of the coil tooth. The tooth 100 includes an elongate arm 102 for windingly receiving a coil of the electric motor. A flange 104 can be provided at one end of the elongate arm 102 of the coil tooth 100 to prevent inadvertent unravelling of the coil from the coil tooth once it has be wound thereon.

In accordance with an embodiment of the invention, each coil tooth is attachably receivable on the back portion 150. Accordingly, each coil tooth can include means for attaching the coil tooth 100 to the back portion 150. In the example shown in FIGS. 9 and 10, these means include two elongate fingers 106. These fingers extend from an end of the elongate arm 102 opposite the flange 104 in a generally V-shaped configuration. As will be discussed below, the back portion 150 can have correspondingly shaped portions to receive these fingers for attaching the coil tooth 102 to the back portion 150.

Figure 16:
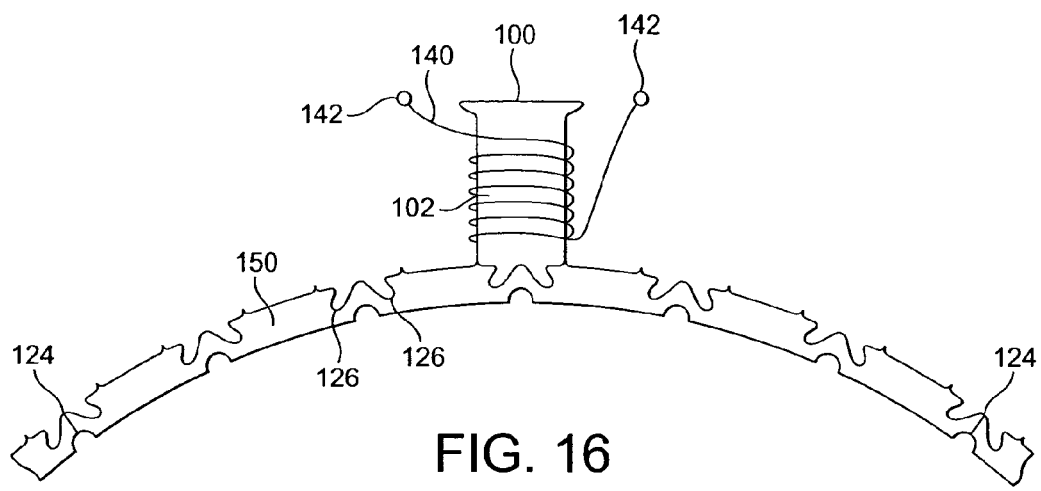
FIG. 16 schematically shows a detailed view of a back portion and coil tooth in accordance with an embodiment of the invention.
Figure 17:
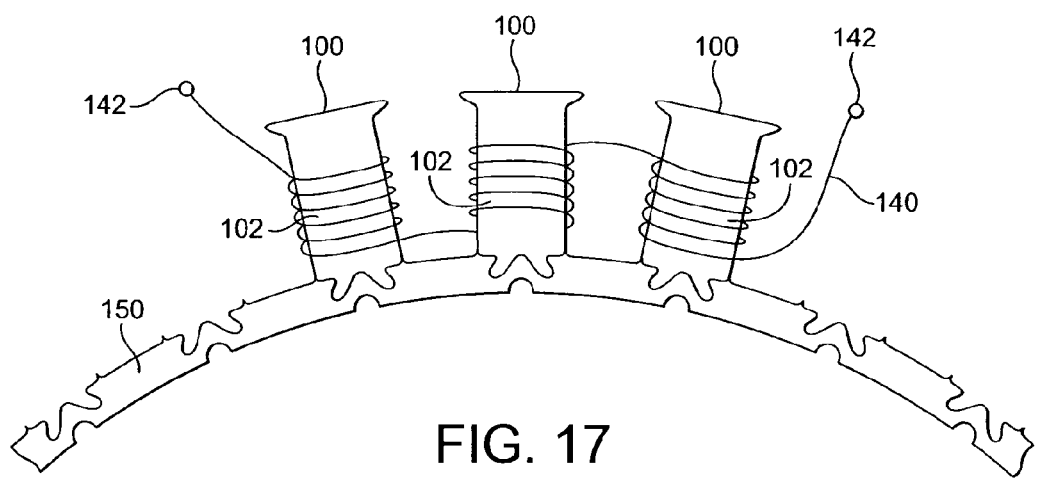
FIG. 17 schematically shows a detailed view of a back portion and a plurality of coil teeth in accordance with an embodiment of the invention.

FIGS. 16 and 17 show the back portion and a received coil tooth in more detail. In the examples shown in FIGS. 16 to 17, the back portion is made up of plurality of smaller back portions 150 which are joined together.

FIG. 16 shows a single coil tooth 100 attachably received in the back portion 150. As shown in FIG. 16, the back portion 150 can include a plurality of openings 126 for receiving correspondingly shaped features of the coil tooth 100, such as the aforementioned V-shaped fingers 106, for allowing attachment of the tooth 100 to the back portion 150.

FIG. 16 shows an example of how the wire of a motor coil can be windingly received around the elongate arm 102 of the coil tooth 100 and terminated at terminals 142. The terminal may comprise, for example, the terminals of a control device of the kind described above. Since the tooth 100 is attachably receivable in the back portion 150, the windings of the coil can be received by the coil tooth 100 at a manufacturing stage prior to attachment of the tooth 100 and the back portion 150. This allows the winding process to be performed away from the rest of the motor components, such that they cannot inhibit the winding process. Accordingly, easy access to the elongate arm 102 can be achieved while the tooth 100 is separate from the back portion 150, and the coil can be wound with minimal risk to the electrical insulation provided thereon. This allows wires having less electrical installation material to be used, which in turn allows for better heat dissipation per unit length of coil. This in turn allows the power rating of the motor comprising the coil mounting system to be maximized.

Figure 1:
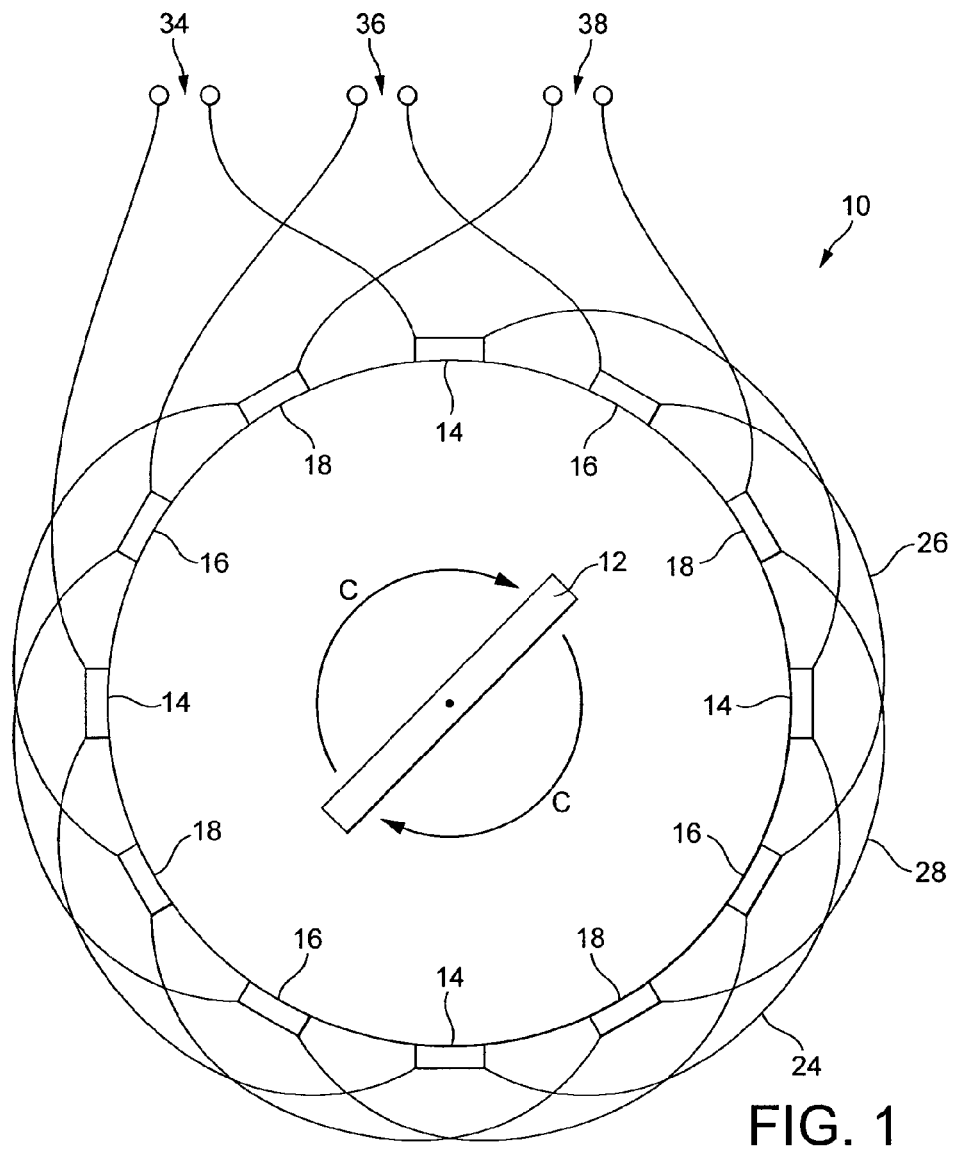
FIG. 1 schematically shows an example arrangement for a three phase motor.
Figure 2:
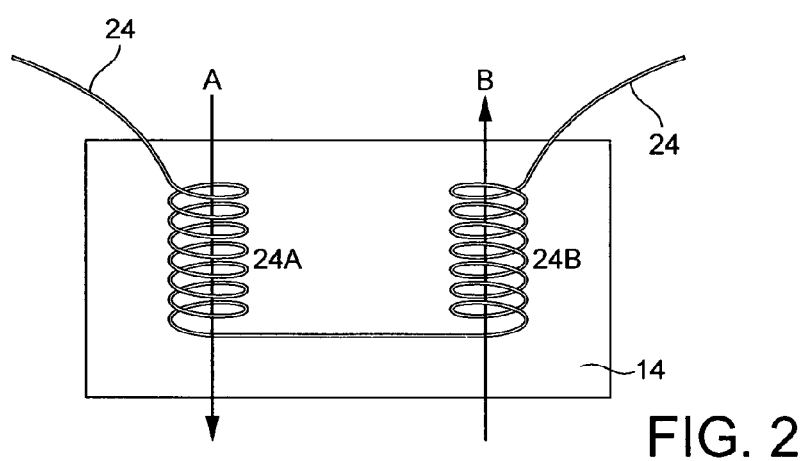
FIG. 2 schematically shows the arrangement of coils in one of the coil sub-sets shown in FIG. 1.

The coil mounting system described herein can be used in conjunction with electric motors which employ series-connected coil sub-sets as described in relation to FIG. 1. In such examples, construction of the electric motor may include taking a single piece of wire and winding it around a plurality of coil teeth away from the back portion, while leaving a length of wire between each tooth to provide the appropriate series interconnections. Once this has been done, the coil tooth could then be attached to the back portion in the appropriate positions.

The coil mounting system described herein lends itself in particular, however, to a motor in which the coil sub-sets are individually controlled. This is because the individual controls require separate termination of the coil teeth of each coil sub-set, whereby it is not necessary to judge the appropriate length of plurality of series interconnections between each coil sub-set when winding the wires around the coil teeth away from the back portion. Instead, a plurality of coil teeth and associated windings can be produced in a first step and then those coil teeth can simply be arranged as desired on the back portion 150.

As described above, there can be more than one coil per coil sub-set. FIG. 17 shows that the present coil mounting system is also compatible with such coil sub-sets. In particular, FIG. 17 shows an example of how three coil teeth 100 can be wound and deployed to form the coils of a coil sub-set according to the present coil mounting system. The arrangement of the windings shown in FIG. 17 corresponds to the arrangement of the coils shown in FIG. 8 as described above.

Further details of the back portion 150 will now be described in relation to FIG. 18. The back portion 150 shown in the figures is substantially arcuate. This allows a plurality of back portions to be interconnected to form a circular larger back portion thereby to construct a circular motor. The back portions 150 are interconnectable to form the larger back portion. In the example shown in FIG. 18 the back portions can be interconnected using features of the coil tooth 100. In particular, it can be seen that the coil tooth 100 shown in FIG. 18 joins together two back portions 150, with one of its fingers 106 received in receiving opening 126 of each of the back portions 150. In other examples, alternative means of interconnecting the back portions can be provided. It is also envisaged that a circular back portion 150 can be provided having a single-piece construction.

Where multiple back portions 150 are interconnected to form a larger back portion, via one of the coil teeth 100, it should be noted that the join between adjacent back portions 150 run substantially parallel to the magnetic field produced by a coil windingly received on the coil tooth 100, whereby the join does not substantially interfere with the magnetic field produced by the coil.

Figure 18:
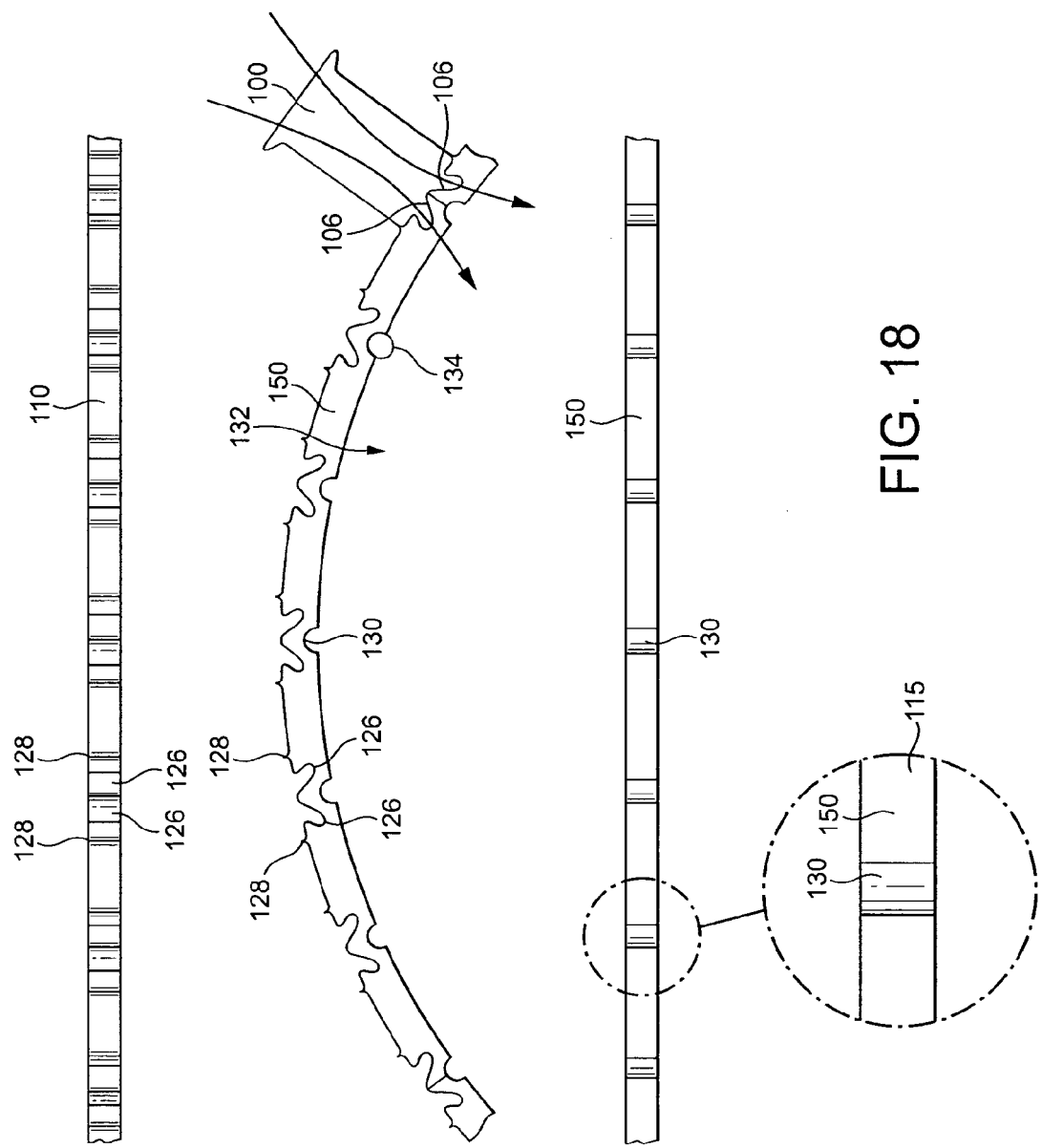
FIG. 18 schematically shows a detailed view of a back portion and coil tooth in accordance with an embodiment of the invention.

As shown in FIG. 18, raised portions 128 can be provided on the outer periphery of the back portion 150 to conform with the shape of the coil teeth.

The back portion 150 can also be provided with features for aiding in heat dissipation. In the present example, the back portion 150 is provided with cut away portions 130. These cut away portions serve to provide a lighter construction for the back portion 150, which is typically constructed from steel or another metal. In accordance with an embodiment of this invention, one or more pins 134 which can be manufactured from, for example aluminium, can be inserted into the cut away portions 130 for providing an improved thermal contact between the back portion 150 and another component of the motor such as the stator.

As shown in FIG. 18, the back portion 150 can have a laminated construction comprising a plurality of layers 115. The back portion can be manufactured using a stamping process in which the plurality of layers 115 are stamped according to the desired shape and configuration of the back portion, stacked together as shown in FIG. 18, and then joined together to form the back portion 150.

This coil mounting system comprising a plurality of interconnected back portions 150 allows an efficient stamping process to be used for constructing the teeth and/or back portions 150 using a laminated construction. This is because relatively little material is lost or wasted, during the stamping process, in contrast to the case where a back portion comprising a single piece laminated construction without interconnections 126 is stamped.

As described above, a plurality of back portions 150 can be interconnected to form a larger back portion. Moreover, a plurality of layers of such interconnected back portions can be stacked together to form a still larger back portion. Examples of this are shown in FIGS. 19 and 20. FIGS. 19 and 20 show a side view of the stacked back portions and there corresponding joins 126. As is shown in FIGS. 19 and 20, the joins 126 can be staggered in a number of different configurations such that adjacent layers of interconnected back portions 150 do not have interconnections 126 which coincide with each other vertically. This serves to increase the strength of the larger back portion comprising the stacked, interconnected back portions 150.

An advantage of using a large number of coils, in conjunction with the arrangement shown in FIGS. 13 to 17, relates to the thickness of the back iron portion 150 needed for a given application. Typically, the thickness of the back portion 150 is approximately one quarter to one half the magnet width to cope with the magnetic flux. Fewer coils would require larger magnets and, therefore, more iron mass leading to a heavier motor design. By using a large number of separate coils, the thickness of the back iron portion 150 can be reduced. The thickness of the iron supporting the magnets on the rotor can also be reduced. It is important that the thickness of the rotor, as a whole, can be as thin as possible, so as to apply the force between the coils and the magnets as close as possible to the outer rim, thereby increasing the turning moment provided.

Seal Arrangement

FIGS. 3 and 4 show various views of an example of a motor according to an embodiment of this invention, and the mechanism for sealing the enclosure will now be described. FIGS. 3 and 4 show a front view and a back view of the motor 210, respectively. The motor 210 in this example includes a casing which has a front portion 220 and a rear portion 230. In FIG. 3, the rear portion 230 and a further cover portion have been removed to reveal the contents of the casing.

In this example, the motor 210 includes a rotor 240 which rotates relative to the stator 252, which may remain stationery during operation of the motor 210. In this example, the rotor 240 includes a plurality of permanent magnets 242, which are arranged in a circle within the substantially circular rotor. As described above, the rotating magnetic fields formed within the motor 210 can provide the necessary attractive and repulsive forces for producing rotational movement of the rotor 240.

The stator 252 can include an arrangement of sets of coils as described above. In particular, in the present example, the coils are arranged in coil sub-sets, each of which is individually controlled by a corresponding control device 280. These control devices 80 are visible in FIG. 3. Underneath the front portion 220, a plurality of plates can be provided to protect to the components of the control devices 280 of the motor 210. As described above in relation to FIG. 7, these components can include one or more semi-conductor devices such as MOSFETs or IGBTs. In the present example, IGBTs are mounted on a printed circuit 82 board as shown in FIG. 10. In this example, there are four IGBTs 88 per control device 80.

Each control device 80 can control the coils of a respective coil sub-set as described above. In the present example, the stator 252 includes a plurality of coil teeth 200, which are mounted on a back portion 250. The coil teeth 200 and back portion 250 can be of the kind described above in relation to, for example, FIGS. 13 to 20.

Returning to FIG. 3, it can be seen that the front portion 220 of the motor casing is provided with first and second hatches 222. These hatches 222 allow access to the control devices 80 of the motor 210 for installation, maintenance and/or repair purposes. Means such as screws 224 can be provided to allow covers of the hatches 222 to be removably attached to the front portion 220. By rotating the front portion 220 of the motor casing relative to the stator 252 and the various control devices 80, access can be gained to the appropriate plate of a desired control device 280. The plate can then be removed to allow access to the control device 80 itself. In this way, the control devices 80 can be maintained/repaired etc without having to completely remove the front portion 220 from the motor 210.

Figure 21:
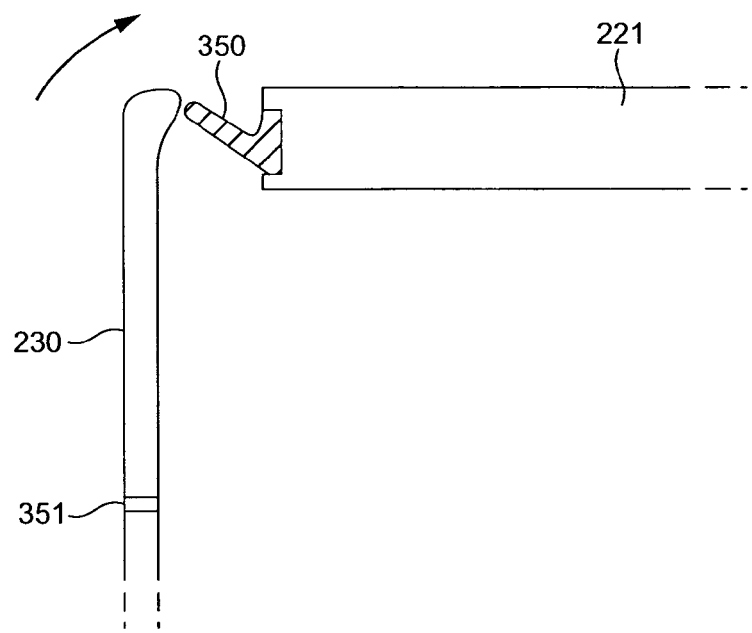
FIG. 21 shows a seal arrangement.

FIG. 21 shows a further part of the seal arrangement by which ingress of material is prevented into the housing of the motor assembly. This shows an enlarged portion of the stator wall 230 and circumferential wall 221 of the rotor at the point at which they meet. A small air gap necessarily exists between the rotor wall and stator wall to allow rotation of one with respect to the other. This gap is filled with a V seal 350, as shown in FIGS. 3 and 4 and shown in greater details in FIG. 21. The seal is fixed to the circumferential wall to one of the rotor housing and a free end of the seal abuts the wall 230 of the stator housing. As the rotor rotates with increasing speed, the free end of the seal is caused to deflect, due to centrifugal force, away from the wall 230 of the stator, thereby minimizing the wear of the seal 350. Ingress of dirt or other materials into the housing is prevented by the centrifugal force caused by rotation of the rotor. In addition, this is assisted by allowing a flow of air through a small hole 351 in the stator wall. This allows a flow of air from the small hole across the interior face of the stator wall 230 and out through the gap presented by the deflected seal 350, thereby ensuring that ingress of dirt or other material is prevented.

It will be clear from the foregoing that embodiments of this invention are applicable to electric generators as well as to electric motors, due in part to the structural and conceptual similarity between the two. For example, an electric generator can benefit from separate power termination of the coils of a coils sub-set as described above. Furthermore, the coil mounting system described above is equally applicable to the construction of the arrangement of coils in a generator and a motor.

Traction Control

As discussed above, motors constructed according to an embodiment of this invention can allow for highly responsive torque control. Furthermore, according to an embodiment of this invention, each wheel of a vehicle can have its own motor. For example, a motor of the kind described above can be provided locally for each wheel.

The use of separate motors for each wheel of a vehicle can allow for increased flexibility in handling traction control for the vehicle. Moreover, the short response times for torque control afforded by a motor according to an embodiment of this invention can enhance this flexibility.

In accordance with an embodiment of the invention, each wheel of a vehicle can be controlled by its own motor and corresponding drive software, thereby allowing each motor to handle its own traction control. This means that each motor can handle, for example, a skid situation independently of the other wheels. Moreover, the fast response times (e.g. within a single PWM period of, for example 50 µs) afforded by embodiments of this invention can allow intricate control of the torque applied to each wheel independently, for increased effectiveness in handling a skid.

In accordance with an embodiment of this invention, motor control is by a high speed continuous range torque loop. This can allow the response to be smoother and the achieved grip to be greater than a mechanically modulated skid management system. The motor drives can be networked together by a controller area network (CAN). This can allow information regarding, for example, skid events to exchanged between the motor drives for coordinated action to be taken. In one example, this information includes acceleration data indicative of the angular acceleration of each wheel. A sharp increase in angular acceleration can be interpreted as a wheel slip of a wheel skid.

Accordingly, an important part of skid management is the detection of the onset of a skid event. As a vehicle such as a car has substantial mass and a wheel has a much smaller mass, an upper limit can be placed upon the rate of change of angular velocity of the wheel, above which a skid must be occurring. This limit can be predetermined according to factors including the weights of the vehicle and the wheels.

According to an embodiment of the invention, sensors such as internal magnetic angle sensors can be provided in the motor of each wheel or in the wheels themselves. These sensors can detect the angular velocity of each wheel. By taking the first derivative of the angular velocity determined by the sensors, the angular acceleration of each wheel can be determined for wheel skid determination.

In another embodiment, wheel skid can be detected comparing each wheel speed with that of the other wheels.

As described above, wheel skid could be detected by detecting changes in the angular velocity of a wheel.

The upper limit for the acceleration of a vehicle can be defined in terms of the total power of all motors ($P_{motors}$) and the vehicle mass ($m_{vehicle}$):

$$P_{motors} = F_{air} \cdot v_{vehicle} + m_{vehicle} \cdot v_{vehicle} \cdot a_{vehicle} \quad (1)$$

where $V_{vehicle}$ is the vehicle velocity and $F_{air}$ is a measure of the air resistance encountered by the vehicle. Equation (1) can be rearranged to form an expression for the upper limit of the acceleration achievable by the vehicle:

$$a_{vehicle} \leq \frac{P_{motors} - F_{air} \cdot V_{vehicle}}{m_{vehicle} \cdot v_{vehicle}} \quad (2)$$

Using equation (2), an expression for an upper feasible limit on the acceleration of a wheel of the vehicle $\alpha_{wheel}$ can be determined:

$$\alpha_{wheel} \leq \frac{a_{vehicle}}{r_{wheel}} = \frac{P_{motors} - F_{air} \cdot v_{vehicle}}{r_{wheel} \cdot (m_{vehicle} \cdot v_{vehicle})} \quad (3)$$

where $\tau_{wheel}$ is the radius of the wheel. This expression could be simplified by assuming that air resistance is negligible (i.e. $F_{air} \approx 0$):

$$\alpha_{wheel} \leq \frac{P_{motors}}{r_{wheel} \cdot m_{vehicle} \cdot v_{vehicle}} \quad (4)$$

For wheel accelerations above the value defined in either equation (3) or equation (4), it can be concluded that a skid is occurring in that wheel.

The actual angular acceleration of a wheel can be determined by computing the derivatives of angular positions of the wheels with respect to time.

In accordance with an embodiment of the invention, this could be achieved using a method such as the Newton finite elements method.

In accordance with another embodiment of the invention, this could be done by interpolating from measurements of angular position of the wheel and then taking derivatives of the interpolated function. In one example, a Pronney interpolation can be used. Using this interpolation, the first and second derivatives of a function f(x) can be defined as:

$$f(x)' = \lim_{\Delta x \to 0} \frac{f(x + \Delta x)}{\Delta x} = \lim_{\Delta x \to 0} \frac{f(x_2) - f(x_1)}{x_2 + x_1} \quad (5)$$

$$f(x)'' = \lim_{\Delta x \to 0} \frac{f(x - \Delta x) - 2 \cdot f(x) + f(x + \Delta x)}{\Delta x^2} \quad (6)$$

Regarding equations (5) and (6) a basic formula for estimation of angular velocity can be defined as:

$$\omega \approx \frac{\theta_k - \theta_{k-1}}{\Delta t} \approx f \cdot (\theta_k - \theta_{k-1}) \quad (7)$$

which gives:

$$\frac{\omega}{f} \approx \theta_k - \theta_{k-1} \quad (8)$$

where k indexes a $k^{th}$ measurement of the angular position of a wheel. Accordingly, in one example, acceleration estimation can be based at least on two intervals defined with three points (where each point constitutes a $k^{th}$ measurement of angular position):

$$\alpha \approx \frac{\omega_k - \omega_{k-1}}{\Delta t} \quad (9)$$

$$\approx \frac{\frac{\theta_k - \theta_{k-1}}{\Delta t} - \frac{\theta_{k-1} - \theta_{k-2}}{\Delta t}}{\Delta t}$$

$$\approx \frac{\theta_k - 2 \cdot \theta_{k-1} + \theta_{k-2}}{(\Delta t)^2}$$

As described above, the determined actual acceleration of each wheel can be compared with the limit defined by, for example, the values given by equations (3) and/or (4) above to determine the occurrence of a skid.

When a skid is detected it is the aim of the motor drive software to take the wheel out of skid as soon as possible. In order to achieve this, the torque applied to the wheel or wheels which are skidding can be reduced. As the torque is reduced, the angular velocity of the wheel will decrease until the wheel stops skidding. Accordingly, the task of the drive software is to reduce the torque applied to the skidding wheel in a manner which allows the skid to be quickly abated.

There are a number of ways in which the torque applied to a skidding wheel can be reduced for regaining traction. For example, a combination of a calculated step reduction in torque followed by a linear reduction could be applied until it is detected that traction been regained. Alternatively, the torque could be dropped to zero or a very low value. The time taken for the wheel to stabilise back to the average vehicle speed could then be determined. This would give enough information to find the grip coefficient of the tyre as the rotational inertia of the wheel is known in advance. In turn, this measurement can then be used to modulate the torque produced in the wheel motor.

As described above, the motor drives of a vehicle can be networked together by, for example, a controller area network (CAN). Networking of this kind can allow the motor drives to communicate for providing improved awareness of each motor drive as to the overall condition of the vehicle. For example, in such a configuration, the motor drives can provide for the maintenance of left/right traction balance across the four wheels of, for example, a car. This can allow a significant left/right imbalance, which could alter the steering direction of the car or even spin it around, to be corrected for.

Figure 22:
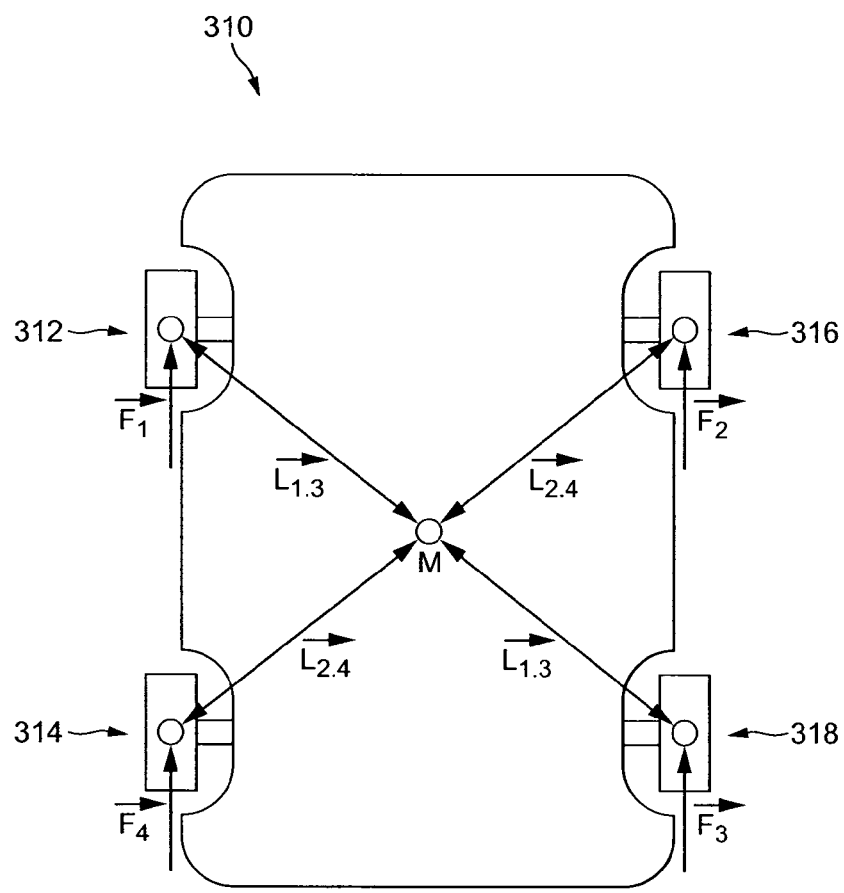
FIG. 22 schematically shows an example of a vehicle having four wheels, and indicates the forces which are incident upon those wheels.

With reference to FIG. 22, if one wheel detects skid, pairs of wheels (for example, wheels 312 and 314, or wheels 316, 318) can react to it by taking similar action. However, a situation should be avoided in which wheels on opposite sides of the vehicle take action, because this could cause the rotation of the vehicle by creating torque. An asymmetric force on different sides of vehicle (left or right one) would produce such a torque. For example if a vehicle were driving along a soft verge with the left wheels of the vehicle on grass and the right wheels on tarmac and the driver braked suddenly, then the vehicle would respond by veering to the right—possibly into the path of oncoming traffic.

According to an embodiment of the invention, traction balancing can be employed which balances the traction of pairs of wheels as described above. For example, left/right balancing can be performed within a certain level of buffering to match the torque loadings of the left and right sets of motors. Balancing of this kind may not be necessary at low speeds or where no significant amount of braking is taking place. In another example, front/rear balancing can be employed—this can allow the vehicle to take maximum advantage the power of each motor.

By way of example, in a vehicle such as car having four wheels, if the left front wheel is skidding but all the others are not, torque can be reduced to the front left wheel, but increased to the rear left to make up the difference. However, in some situations, the rear left may not be able to fully make up for the reduction in torque of the front left. If this is the case then both the right hand side motors could reduce their torque to even the left/right torque balance to within a certain 'buffer' amount. Predetermined rules can be employed by each drive motor to determine how it should react in a given situation. Since the rules are predetermined, each motor can assume that other drive motors in the vehicle will react in a manner which is defined by those rules. In this way, the drive motors can act in a co-ordinated manner as described above. Furthermore, the predetermined rules can be altered according to, for example, driving conditions including the wetness of the road surface and the temperature of the road.

Suspension Control

The use of separate motors for each wheel of a vehicle can also allow for increased flexibility in handling suspension control for the vehicle. Again, the short response time for torque control afforded by a motor according to an embodiment of this invention can enhance this flexibility still further.

Figure 23:
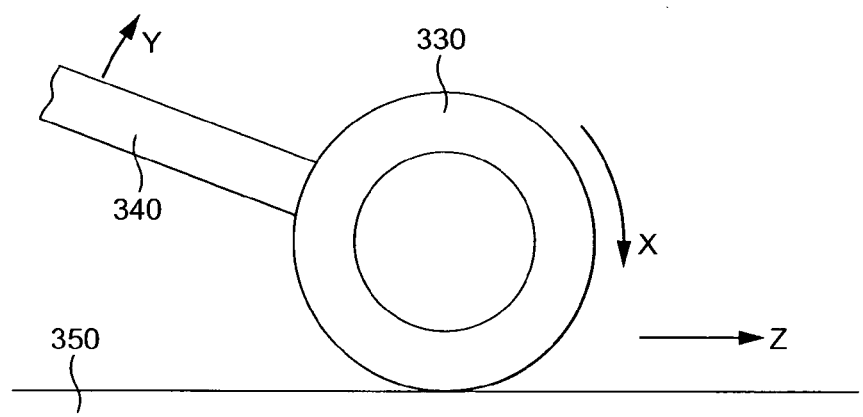
FIG. 23 schematically shows an example of a wheel mounted on a suspension arm.

In accordance with an embodiment of the invention, there can be provided a suspension control system for a vehicle having a plurality of wheels. With reference to FIG. 23, each wheel 330 in this example can be mounted on a suspension arm 340.

In FIG. 23, the normal direction of travel of the vehicle with respect to the surface 350 is shown in FIG. 23 by the arrow labelled Z. Accordingly, as shown in FIG. 23, the wheel 330 is rotates in the direction indicated by the arrow labelled X. If additional torque is applied to the wheel in the direction indicated by the arrow labelled X, this will tend to impart a force on the suspension arm 340, whereby the suspension arm 340 will tend to rise up in the direction indicated in FIG. 23 by the arrow labelled Y. In this example, the wheel 330 is a front wheel of a vehicle such as a car. The rising up of the suspension arm 340 in the direction indicated by the arrow labelled Y in FIG. 23, would therefore cause the front of the car in locality of the wheel 330 to rise up also. In this way, by adjusting the torque to the wheel of a vehicle, a suspension control system for a vehicle can be implemented.

In accordance with an embodiment of this invention, there can be provided a suspension control system in which the torque applied to each wheel of a vehicle can be selectively adjusted for adjusting the suspension and/or height of the vehicle. The control system can be implemented by a control unit which can be provided either for each respective wheel or which can be provided as a central control unit operable to control a plurality of wheels. Each wheel can be powered, for example, by an electric motor of the kind described above. In such embodiments, the fine control and swift response times afforded by the motor described above can enhance the responsiveness of the suspension control. The control devices for controlling the suspension can be networked together using a control area network (CAN) as described above.

In a first example of a situation in which the ability to independently control the suspension of a plurality of wheels using torque control is where a vehicle is travelling around a corner. When a vehicle is travelling round a corner, it may be desirable to tilt the vehicle such that the side of the vehicle on the outside of the corner rises up with respect to the side of vehicle on the inside of the corner. This can be used to counterbalance the tendency of the outside of the vehicle to tilt downwards toward the surface of the road. In this example, more torque can be provided to the outer wheels of the vehicle (i.e. the wheels of the vehicle on the outside of the corner) in order to raise that part of the vehicle. Conversely, less torque can be provided to the wheels on the inside of the corner. This would lower the suspension of the vehicle on the inside of the corner as desired.

The above example describes a situation in which pairs of wheels in the vehicle are controlled together, to raise, or lower a portion of the vehicle. In another example, the front wheels of a vehicle and the back wheels of the vehicle can be controlled to act against each other having the effect of raising the overall level of the vehicle. In particular, more/less torque can be provided to the front/rear wheels of a vehicle for effectively pushing the suspension arms of the wheels of the front and rear of the vehicle toward each other, thereby causing them both to rise up.

In accordance with an embodiment of the invention, inputs to a control system such as the traction and/or suspension control system can be made via steering wheel sensors and vehicle attitude and yaw sensors.

In one example, if a vehicle is in a skid management state (in which a skid in one or more of the wheels has been detected) and the driver elects to move the steering wheel abruptly in one direction, this movement magnitude and rate of change can be communicated to the control devices described above so that appropriate compensating action can be taken by the control devices in their traction control strategy. Accordingly, a feed forward function of drivers intentions can be added to the wheel drive software strategy to better handle a skid and respond to the drivers commands. Because of the increased responsiveness of an electric motor of the kind described above, the response of the individual wheels can be much faster than that of existing systems. Moreover, since each wheel responds according to its local conditions, the possibility of more stable control exists when compared to existing systems.

The traction control and suspension control systems described above may be implemented using software executing on a microprocessor. The software can be provided on a carrier medium.

Magnet Mounting

A particularly effective manner of magnet mounting is shown in FIG. 24. As already described, magnets are mounted around the inside circumferential wall 221 of the rotor 252. The magnets transfer all of the force from the magnetic field of the coils to the rotor and so, we have appreciated, must be securely mounted to the circumferential rotor wall 221.

A portion of the circumferential wall, including magnets 242, is shown as enlargement A in FIG. 24. At each magnet position, there are actually three separate magnets 401, 402 and 403, which are inserted into dovetail slots 405 of the rotor back iron 407. This arrangement has a number of advantages. First, by using separate magnet portions to create a single magnet at each magnet position, eddy currents in the magnets can be reduced. Whilst three separate magnet portions are preferred, other numbers would be perfectly possible. Second, the dovetail mounting arrangement ensures exact location of the magnets on the circumferential wall 221 and also ensures that they are securely mounted. Other slot type arrangements would be possible, but the dovetail mounting arrangement is preferred.

Cooling Arrangement

Figure 25:
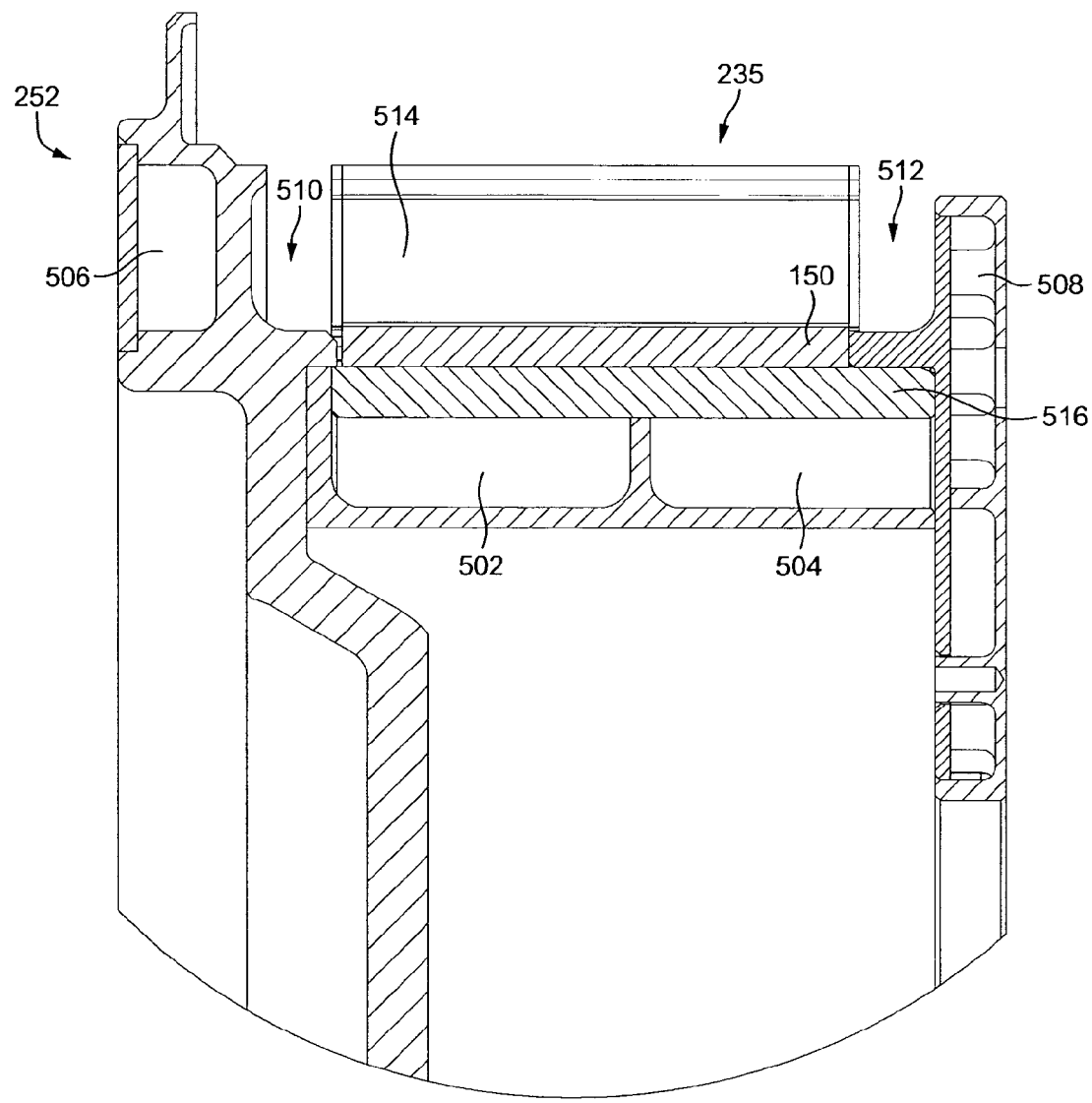
FIG. 25 schematically shows a cooling arrangement for the stator coils of an embodiment of the invention.

A particularly effective configuration for cooling the coils is shown in FIG. 25. This view of the stator is a cross section in the plane of the axis of the stator. Referring briefly to FIG. 3, the coil teeth 235 of FIG. 3 are shown in cross section in FIG. 25 with a single coil tooth 514 shown, which can receive windings, which fit in the winding spaces 510 and 512. As described in relation to FIGS. 16 and 17, the teeth are mounted on a back iron 150. The back iron is mounted directly on a cooling plate 516, which, together with other walls, defines cooling channels 502 and 504, through which cooling fluid can circulate either by convection or by pumping. In addition, a cooling channel 508 on one side of the coils in space 512 cools the coils on one side of the teeth and a cooling channel 506 on the opposite side cools the coils in space 510. Accordingly, the coils are cooled by this multi faceted cooling plate, which encloses the windings on three sides. In addition, the faces of the cooling channels provide for the attachment of electronic power devices such as the control devices 80, dump resistor and so on. A single three sided cooling arrangement thus provides the cooling for the coils, as well as the associated components from which heat is generated.

The whole assembly of the coils is potted onto the cooling plate using a thermally conductive material but electrically insulating material, such as epoxy filled with aluminium oxide. This improves the thermal conductivity from the coils to the back iron and to the cooling plate.

The invention claimed is:

1. An electric motor of the type comprising a plurality of coils circumferentially mounted around a stator on teeth and a plurality of magnets mounted on a rotor, wherein the motor includes a cooling plate having channels that are arranged as to cool the coils on three sides, wherein a first channel is provided on a first side of the coils located on a first side of the teeth, a second channel is provided on a second side of the coils located on a second side of the teeth, and a third channel is provided on a third side of the teeth that is adjacent to the first and second sides of the teeth; and wherein coolant fluid is arranged to flow through the first channel, the second channel and the third channel.

2. The electric motor according to claim 1, wherein the cooling plate is arranged such that a face opposite the coils can receive control circuitry.

3. The electric motor according to claim 1, wherein the coils are potted in a thermally conductive material.

4. The electric motor according to claim 3, wherein the coils are potted onto the cooling plate using a thermally conductive material.

* * * * *